(12) United States Patent
Pawlowski et al.

(10) Patent No.: US 11,630,691 B2
(45) Date of Patent: *Apr. 18, 2023

(54) MEMORY SYSTEM ARCHITECTURE FOR MULTI-THREADED PROCESSORS

(71) Applicant: Intel Corporation, Santa Clara, CA (US)

(72) Inventors: Robert Pawlowski, Beaverton, OR (US); Ankit More, San Mateo, CA (US); Jason M. Howard, Portland, OR (US); Joshua B. Fryman, Corvallis, OR (US); Tina C. Zhong, Portland, OR (US); Shaden Smith, Mountain View, CA (US); Sowmya Pitchaimoorthy, Hillsboro, OR (US); Samkit Jain, Hillsboro, OR (US); Vincent Cave, Hillsboro, OR (US); Sriram Aananthakrishnan, Hillsboro, OR (US); Bharadwaj Krishnamurthy, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/410,818

(22) Filed: Aug. 24, 2021

(65) Prior Publication Data

US 2021/0389984 A1 Dec. 16, 2021

Related U.S. Application Data

(63) Continuation of application No. 16/147,302, filed on Sep. 28, 2018, now Pat. No. 11,106,494.

(51) Int. Cl.
*G06F 9/30* (2018.01)
*G06F 9/35* (2018.01)
(Continued)

(52) U.S. Cl.
CPC ........ *G06F 9/4881* (2013.01); *G06F 9/30043* (2013.01); *G06F 9/35* (2013.01);
(Continued)

(58) Field of Classification Search
None
See application file for complete search history.

(56) References Cited

U.S. PATENT DOCUMENTS 5,603,005 A * 2/1997 Bauman ............... G06F 12/0828
711/144
5,634,046 A * 5/1997 Chatterjee ............. G06F 9/3013
712/E9.035

(Continued)

OTHER PUBLICATIONS

Final Office Action, U.S. Appl. No. 16/147,302, dated Nov. 16, 2020, 10 pages.

(Continued)

*Primary Examiner* — Hyun Nam
(74) *Attorney, Agent, or Firm* — Nicholson De Vos Webster & Elliott LLP

(57) ABSTRACT

Disclosed embodiments relate to an improved memory system architecture for multi-threaded processors. In one example, a system includes a system comprising a multi-threaded processor core (MTPC), the MTPC comprising: P pipelines, each to concurrently process T threads; a crossbar to communicatively couple the P pipelines; a memory for use by the P pipelines, a scheduler to optimize reduction operations by assigning multiple threads to generate results of commutative arithmetic operations, and then accumulate the generated results, and a memory controller (MC) to connect with external storage and other MTPCs, the MC further comprising at least one optimization selected from: an instruction set architecture including a dual-memory operation; a direct memory access (DMA) engine; a buffer to store multiple pending instruction cache requests; mul- (Continued)

tiple channels across which to stripe memory requests; and a shadow-tag coherency management unit.

24 Claims, 34 Drawing Sheets

(51) Int. Cl.
*G06F 9/48* (2006.01)
*G06F 12/0815* (2016.01)
*G06F 9/38* (2018.01)
*G06F 13/28* (2006.01)

(52) U.S. Cl.
CPC .......... *G06F 9/3836* (2013.01); *G06F 9/3877* (2013.01); *G06F 12/0815* (2013.01); *G06F 13/28* (2013.01)

(56) References Cited

U.S. PATENT DOCUMENTS

| | | | | |
|---|---|---|---|---|
| 9,058,680 | B2* | 6/2015 | Stamoulis | G06T 11/00 |
| 2004/0133767 | A1* | 7/2004 | Chaudhry | G06F 9/30105 |
| | | | | 712/225 |
| 2005/0177819 | A1* | 8/2005 | Ober | G06F 9/3861 |
| | | | | 712/E9.046 |
| 2011/0185125 | A1* | 7/2011 | Jain | G06F 12/0811 |
| | | | | 711/E12.024 |
| 2011/0225372 | A1* | 9/2011 | Pirog | H04L 47/2416 |
| | | | | 711/141 |
| 2011/0258245 | A1* | 10/2011 | Blocksome | G06F 15/17318 |
| | | | | 712/30 |
| 2011/0320724 | A1* | 12/2011 | Mejdrich | G06F 13/28 |
| | | | | 711/125 |
| 2014/0173604 | A1* | 6/2014 | Archer | G06F 9/46 |
| | | | | 718/100 |
| 2016/0283249 | A1* | 9/2016 | Forsell | G06F 9/3893 |
| 2017/0075629 | A1* | 3/2017 | Manohar | G06F 12/0246 |
| 2020/0004587 | A1* | 1/2020 | Griffin | G06F 9/4881 |
| 2020/0004602 | A1* | 1/2020 | Pawlowski | G06F 9/30087 |
| 2020/0104164 | A1* | 4/2020 | Pawlowski | G06F 9/4881 |

OTHER PUBLICATIONS

Non-Final Office Action, U.S. Appl. No. 16/147,302, dated Mar. 19, 2020, 10 pages.

Notice of Allowance, U.S. Appl. No. 16/147,302, dated May 5, 2021, 8 pages.

* cited by examiner

300

Dual-Memory Operations Supported within each Memory Controller

| Operation | Description | Inputs | Notes |
|---|---|---|---|
| Indirect Load | x = b[a[i]] + k | i = pointer address;<br>k = dereferencing offset; | Can be issued from pipeline. DMA engine does not directly use this op. Loaded data will be returned to the original requestor. |
| Indirect Store | b[a[i]] + k = x | i = pointer address;<br>k = dereferencing offset;<br>x = data value to store; | Can be issued from pipeline. DMA engine uses for broadcast. Data provided by requestor is stored at final location. |
| Load-Storect | b[j] = a[i] (mem ctcopy) | i = source address;<br>j = destination address | Can be issued from pipeline or DMA engine. |
| Indirect-Ld-Scrt | c[j] = b[a[i]] + k | i = source pointer address;<br>k = dereferencing offset;<br>j = destination address | Can be issued from pipeline. Used for DMA gather/scatter-type operations. |

FIG. 3

Input Request FIFO 800

```
#pragma omp for reduction(+:ntriangles)
for(int v=0; v < nvertices; v++) {
    nlocal = triangle_count(v);
    ntriangles += nlocal;
}
```

Machine instructions to support reductions

| Instruction | ASM form Arguments | Description | Notes |
|---|---|---|---|
| reduce.wait | r1, r2, r3 | r1–reduction ID, r2 reg to return final data value, r3-reg to return maxloc/minloc result | r3 only touched if o is maxloc/minloc |
| reduce.poll | r1, r2, r3, r4 | r1-reduction ID, r2-reg to receive status, r3 reg to return final data value, r4-reg to return maxloc/minloc result | Return values to r3 only if successful; r touched if operation maxloc/minloc |
| reduce.max(S/U/F) | r1, r2, SIZE | r1-reduction ID, r2-input data, SIZE-64b/32b/16b/8b | Can be signed, unsi or floating point. |
| reduce.min(S/U/F) | r1, r2, SIZE | r1-reduction ID, r2-input data, SIZE-64b/32b/16b/8b | Can be signed, unsi or floating point. |
| reduce.add(I/F) | r1, r2, SIZE | r1-reduction ID, r2-input data, SIZE-64b/32b/16b/8b | Can be integer or fl point |
| reduce.mul(I/F) | r1, r2, SIZE | r1-reduction ID, r2-input data, SIZE-64ctb/32b/16b/8b | Can be integer or fl point |
| reduce.bitop | r1, r2, bitop, SIZE | r1-reduction ID, r2-input data, bitop – and/or/xor, SIZE-64b/32b/16b/8b | |
| reduce.maxloc(S/U/F) | r1, r2, r3, SIZE | r1-reduction ID, r2-input data, r3-index, SIZE-64b/32b/16b/8b | Index value is speci the programmer |
| reduce.minloc(S/U/F) | r1, r2, r3, SIZE | R1-reduction ID, r2-input data, r3-index, SIZE-64b/32b/16b/8b | Index value is speci the programmer |

FIG. 11

Core collective engine MSR entries that exist for each reduction configuration

1200

| Name | Description | Size | R/W? |
|---|---|---|---|
| ENABLE | reduce.* instructions will be accepted. | 1 | R/W |
| DONE | Instruction in this MSR ID thread is done. | 1 | R |
| MODE | Push-mode or poll-mode? | 1 | R/W |
| PUSH_VECTOR_PC | Start PC for push interrupt vector | 64 | R/W |
| PUSH_TARGET_TID | Thread ID to execute push interrupt | 21 | R/W |
| CONFIG_COUNT | User-defined count of participating threads in the pipeline. | <=8 | R/W |
| ACTIVE_COUNT | Active running count of threads who have contributed to the reduction. | <=8 | R |
| ACTIVE_OP | Operation type set by first received instruction request for this ID | 10 | R |
| DATA_1 | Reduced data value | 64 | R |
| DATA_2 | Thread ID | 64 | R |

Multi-Threaded Processor (MTP) Support for Prefix Scans

| Instrctuctction | ASM form arguments | Description | Notes |
|---|---|---|---|
| prefix.wait | r1 | r1–prefix scan ID | Programmer responsible for reading data from prefix buffer. |
| prefix.poll | r1, r2 | r1-prefix scan ID, r2-reg to receive status | Programmer responsible for reading data from prefix buffer. |
| prefix.sum(I/F) | r1, r2, SIZE | r1-prefix scan ID, r2-base address, SIZE-64b/32b/16b/8b | Can be integer, or floating point. |
| prefix.mul(I/F) | r1, r2, SIZE | r1-prefix scan ID, r2-base address, SIZE-64b/32b/16b/8b | Can be integer, or floating point. |

FIG. 13

Offset Calculation 1480

Commands from the D-cache to the Shadow Tag Coherency Management Unit

1600

| Command Name / Notification Name | Info needed | Description | Responses | Additional response Info |
|---|---|---|---|---|
| RD | Address, Way, requeCTst ID | Cache requests a cacheline for read | a) Ack<br>b) Ack with No sharers enabled for E state<br>c) Nack causes interrupt | Response ID, Data received from Memory or Other Core |
| WR | Address, Way, Request ID | Cache requests a cacheline for write | Ack | Response ID |
| UpgradeE2M | Address, Way, Request ID | Cache requests an upgrade of its cacheline from E to state M | Notification; No response needed | |
| Evict Notification | Address, Way, Request ID | Cache is Evicting a particular address | Notification; No Response needed | |

Commands from the Shadow Tag Coherency Management Unit to the D-Cache

| Command name / Notification name | Request type | Info needed | Description | Responses | Additional response Info |
|---|---|---|---|---|---|
| Invalidate | 4'd0 | Index, Way, Request ID | Shadow tag asks a particular cache to invalidate | a) Ack<br>b) Nack causes interrupt | Response ID |
| Forward and Invalidate to Pipe 'x' | 4'd1 | Index, Way, Request ID, Core number | Shadow tag asks a particular cache to invalidate and send data to Core X | a) Ack<br>b) Nack causes interrupt | Response ID |
| Forward to Pipe 'x' | 4'd2 | Index, Way, Request ID, Core number | Shadow tag asks a particular cache send data to Core X | No Ack needed Nack causes interrupt | Response ID |
| Float F | 4'd3 | Index, Way, Request ID | Shadow tag promotes an S to F | No ack needed /Nack causes interrupt | No Response |
| Float O | 4'd4 | Index, Way, request ID | Shadow tag promotes an S to O | No ack needed /Nack causes interrupt | No Response |
| Float E | 4'd5 | Index, Way, Request ID | Shadow tag promotes an S to E or F to an E | No ack needed /Nack causes interrupt | No Response |
| Float M | 4'd6 | Index, Way, request ID | Shadow tag promotes an S to M or O to M | No ack needed /Nack causes interrupt | No Response |
| Forward and Float F | 4'd7 | Index, Way, Request ID, Core number | Shadow tag demotes an E to an F and asks it to forward data to Pipe 'x' | c) Ack<br>d) Nack causes interrupt | Response ID |
| Forward and Float O | 4'd8 | Index, Way, Request ID, Core number | Shadow tag demotes an M to an O and asks it to forward data to Pipe 'x' | e) Ack<br>f) Nack causes interrupt | Response ID |

FIG. 17

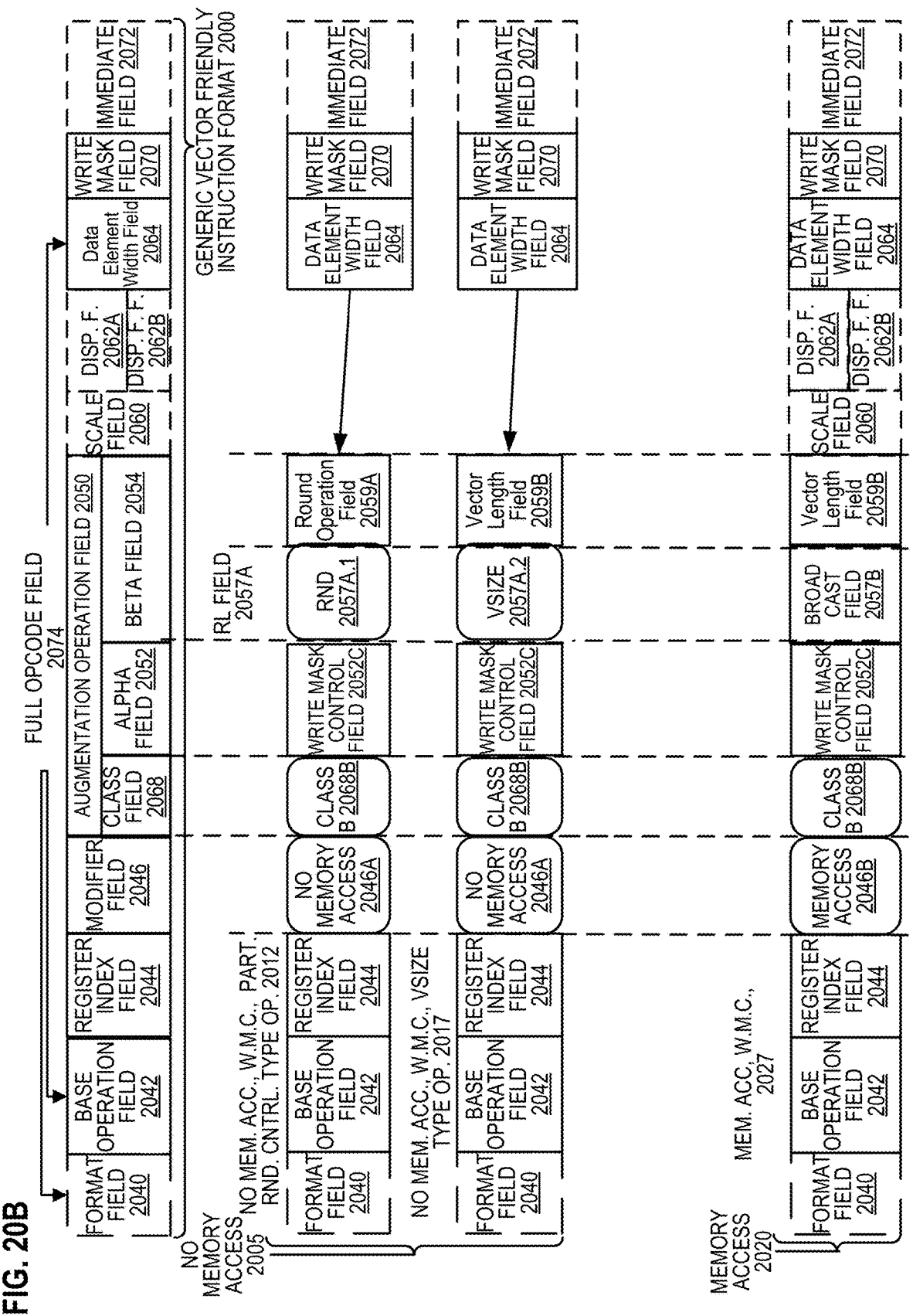

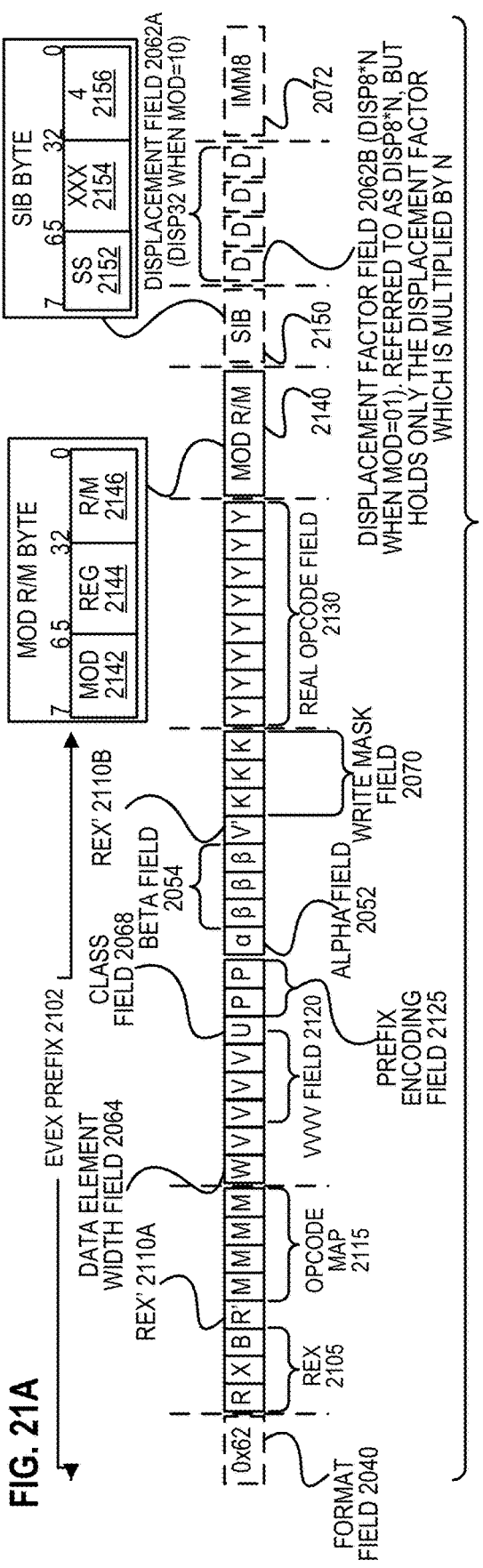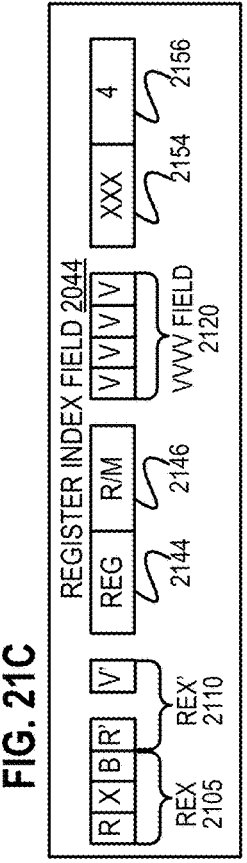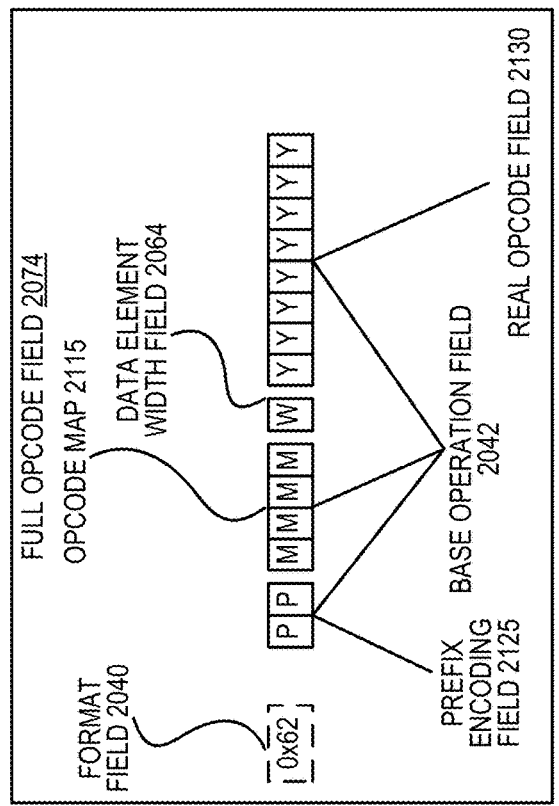
FIG. 21A
FIG. 21B
FIG. 21C

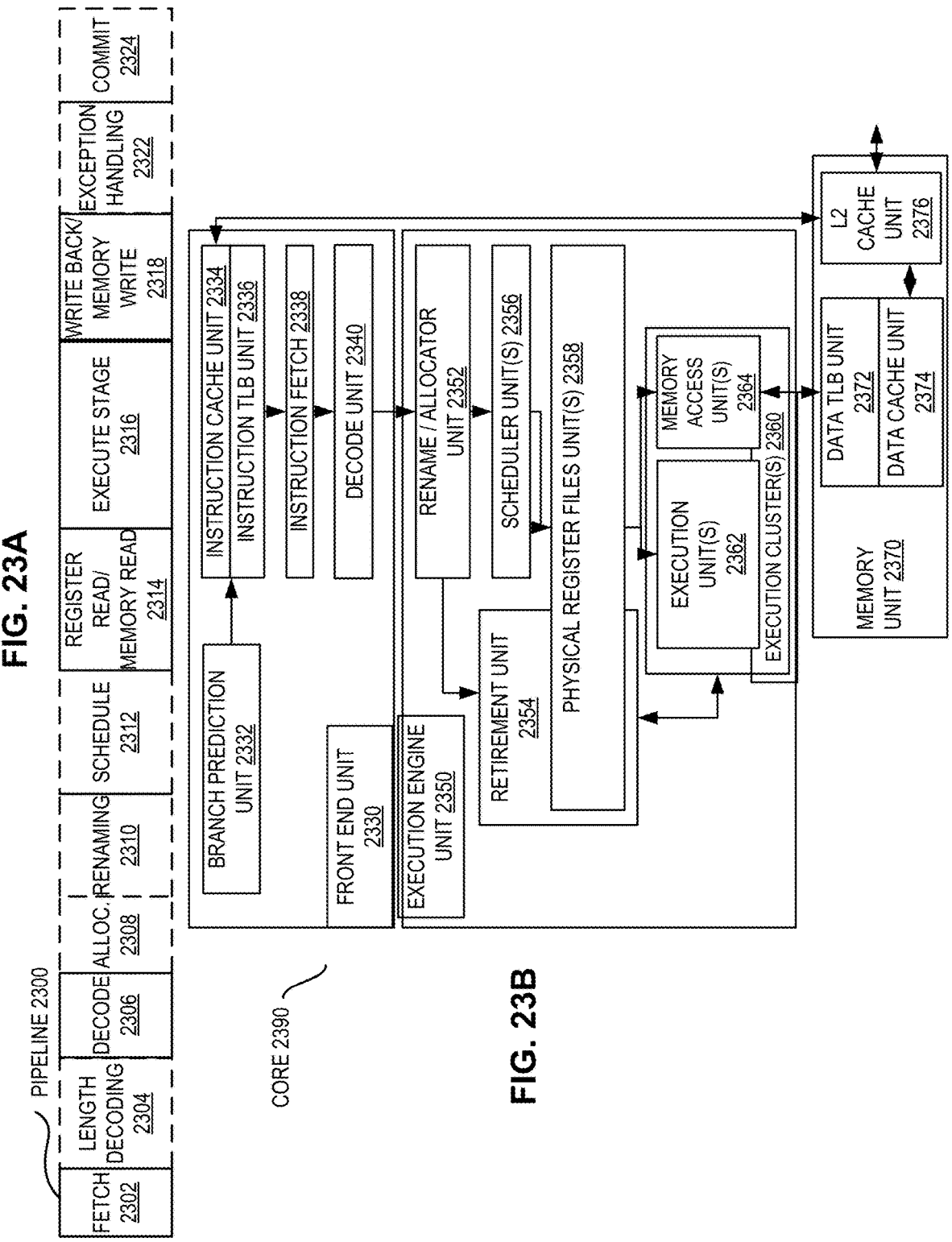

MEMORY SYSTEM ARCHITECTURE FOR MULTI-THREADED PROCESSORS

CROSS-REFERENCE TO RELATED APPLICATIONS

The present patent application is a continuation application claiming priority from U.S. patent application Ser. No. 16/147,302, filed Sep. 28, 2018, and entitled "Memory System Architecture for Multi-Threaded Processors," now U.S. Pat. No. 11,106,494, which is incorporated herein by reference in its entirety.

STATEMENT REGARDING FEDERALLY SPONSORED RESEARCH AND DEVELOPMENT

This invention was made with Government support under Agreement No. HR0011-17-3-0004, awarded by DARPA. The Government has certain rights in the invention.

FIELD OF THE INVENTION

The field of invention relates generally to computer processor architecture, and, more specifically, to an improved memory system architecture for multi-threaded processors.

BACKGROUND

With the advancement of simultaneous multi-threaded (SMT) processors comes the potential for improved processing performance, especially in the context of vectorization and parallel processing in the context, for example, of graph analytics workloads.

At the same time, having multiple threads operating concurrently and all accessing memory presents challenges with respect to the memory system architecture.

First, for example, direct memory operations to move data from one memory location to another incur significant latencies, especially when each datum being moved is first returned to the requesting core pipeline.

Second, for example, each multi-threaded processor (MTP) sometimes executes multiple, say 16, threads concurrently, and each thread accesses one common instruction cache. This creates unique challenges, including, for example, handling the instruction cache misses from all threads. The pressure points not only come from the MTP but also from the back pressure of the network.

Third, for example, reduction operations—i.e., when many data elements are reduced down to one element via some commutative operation—are commonly encountered and are difficult to efficiently implement using software only.

Fourth, for example, some SMT processors attempt to increase available memory bandwidth. To avoid hot spots in accessing the memory channels itis often required that the accesses be spread across the memory channels to avail the full bandwidth. In most system, this striping of addresses across the memory channels is either fixed or configured at boot.

Fifth, for example, some SMT processors attempt to maximize memory throughput by having multiple concurrent outstanding memory requests, which means the hardware must efficiently keep track of them.

BRIEF DESCRIPTION OF THE DRAWINGS

The present invention is illustrated by way of example and not limitation in the figures of the accompanying drawings, in which like references indicate similar elements and in which:

FIG. 3 is a table showing dual-memory operations supported within each memory controller, according to some embodiments;

FIG. 4 is a table listing dual-memory operations supported within each memory controller, according to some embodiments;

FIG. 8 is pseudo-code of a triangle counting algorithm using a reduction operation on every iteration;

FIG. 11 is a table listing machine instructions to support reductions, according to some embodiments;

FIG. 12 is a table listing core collective engine MSR entries that exist for each reduction configuration, according to some embodiments;

FIG. 13 is a table listing machine instructions to perform prefix scans, according to some embodiments;

FIG. 16 is a table listing commands from the D-cache to the Shadow Tag Coherency Management Unit, according to some embodiments;

FIG. 17 is a table listing commands from the Shadow Tag Coherency Management Unit to the D-Cache, according to some embodiments;

FIGS. 20A-20B are block diagrams illustrating a generic vector friendly instruction format and instruction templates thereof according to some embodiments;

FIG. 20A is a block diagram illustrating a generic vector friendly instruction format and class A instruction templates thereof according to some embodiments;

FIG. 20B is a block diagram illustrating the generic vector friendly instruction format and class B instruction templates thereof according to some embodiments;

FIG. 21A is a block diagram illustrating an exemplary specific vector friendly instruction format according to some embodiments;

FIG. 21B is a block diagram illustrating the fields of the specific vector friendly instruction format that make up the full opcode field according to one embodiment;

FIG. 21C is a block diagram illustrating the fields of the specific vector friendly instruction format that make up the register index field according to one embodiment;

FIG. 23A is a block diagram illustrating both an exemplary in-order pipeline and an exemplary register renaming, out-of-order issue/execution pipeline according to some embodiments;

FIG. 23B is a block diagram illustrating both an exemplary embodiment of an in-order architecture core and an exemplary register renaming, out-of-order issue/execution architecture core to be included in a processor according to some embodiments;

FIG. 24A is a block diagram of a single processor core, along with its connection to the on-die interconnect network and with its local subset of the Level 2 (L2) cache, according to some embodiments;

FIG. 24B is an expanded view of part of the processor core in FIG. 24A according to some embodiments;

FIG. 26 shown a block diagram of a system in accordance with some embodiments;

FIG. 27 is a block diagram of a first more specific exemplary system in accordance with some embodiment;

FIG. 28 is a block diagram of a second more specific exemplary system in accordance with some embodiments;

FIG. 29 is a block diagram of a System-on-a-Chip (SoC) in accordance with some embodiments.

DETAILED DESCRIPTION OF THE EMBODIMENTS

Figure 1:
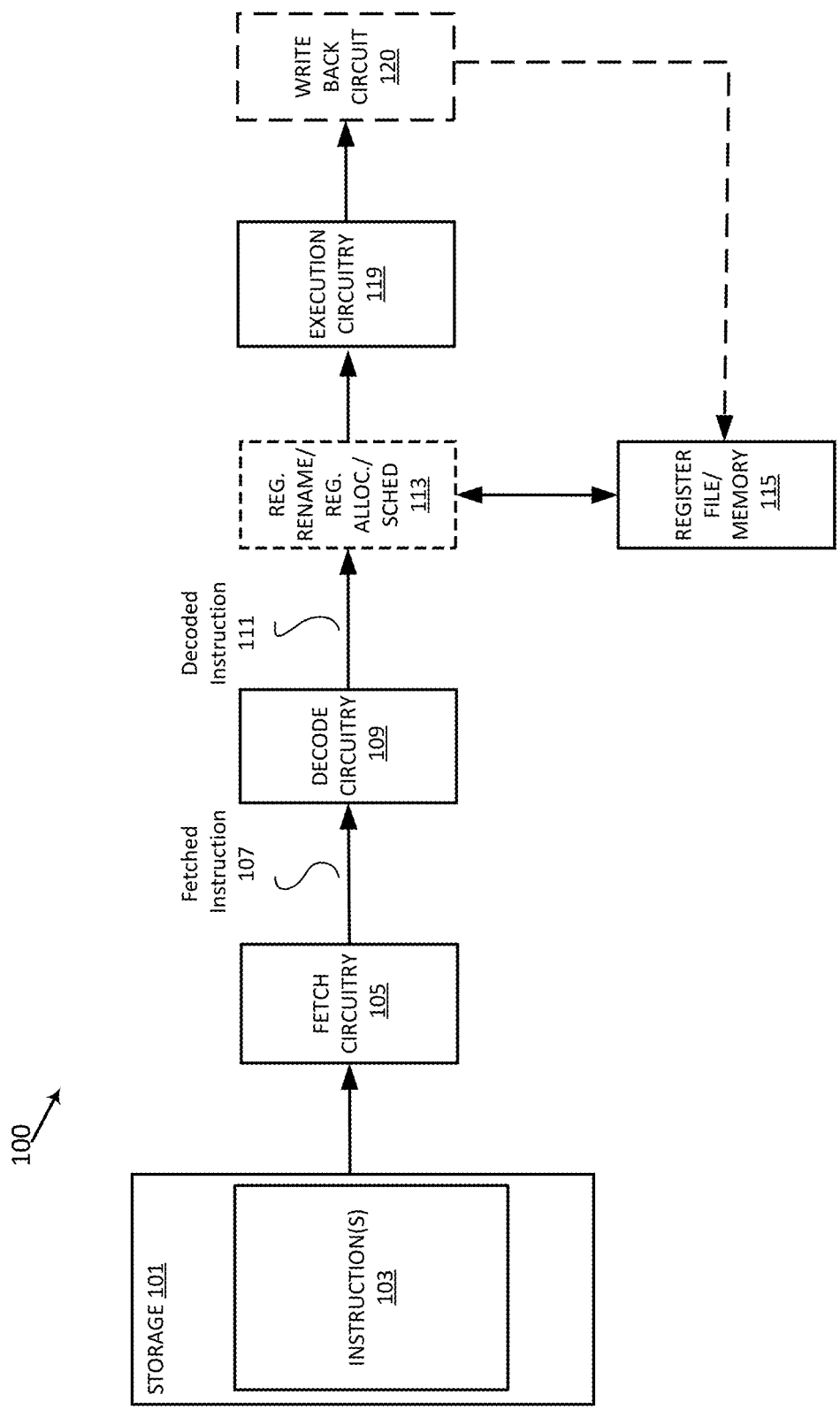
FIG. 1 is a block diagram illustrating processing components for executing instructions, according to some embodiments.

In the following description, numerous specific details are set forth. However, it is understood that some embodiments may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a feature, structure, or characteristic, but every embodiment may not necessarily include the feature, structure, or characteristic. Moreover, such phrases are not necessarily referring to the same embodiment. Further, when a feature, structure, or characteristic is described about an embodiment, it is submitted that it is within the knowledge of one skilled in the art to affect such feature, structure, or characteristic about other embodiments if explicitly described.

Disclosed embodiments describe an improved system architecture for a multi-threaded processor. Namely, disclosed embodiments describe a system including a multi-threaded processor core (MTPC). The disclosed MTPC includes P pipelines, each to concurrently process T threads, a crossbar to communicatively couple the P pipelines, a memory for use by the P pipelines, and a memory controller (MC) to connect with external storage and other MTPCs. Disclosed embodiments further describe improving the system using at least one of several optimizations, including the following.

First, the below section entitled "Dual-Memory Operations for Efficient Direct Memory Transactions," along with the associated drawings, describe improved methods and systems for enabling multi-threaded processors (MTP) to perform direct memory operations to move data from one memory location to another with reduced latencies, especially in comparison to approaches of performing a DMA when each datum being moved is first returned to the requesting core pipeline. To implement such an optimization, the memory controller in some embodiments is made to support an instruction set architecture (ISA) including a dual-memory operation. In operation, a memory controller implementing such an ISA is to perform dual memory operations.

Second, the below section entitled "Direct Memory Operations and Their Use," describe improved methods and systems to facilitate direct memory operations—encompassing those that involve data movement between two memory locations and require little compute. To implement such an optimization, a direct memory access (DMA) engine is used. In operation, embodiments implementing such an optimization are to offload block memory transfers from the pipeline using a DMA engine.

Third, the below section entitled "An Approach to Efficiently Handle Instruction Cache Misses," along with the associated drawings, describe improved methods and systems to allow each multi-threaded processor (MTP) to executes multiple, say 16, threads concurrently, with each thread accessing one common instruction cache. The described embodiments address unique challenges, including, for example, handling the cache misses from all threads. The pressure points not only coming from the MTP but also from the back pressure of the network. Some embodiments allow multiple instruction cache requests to be issued and coordinate their receipt. To implement such an optimization of a cache request manager, some embodiments include a buffer to store multiple pending instruction cache requests. In operation, memory controllers implementing this optimization are to store multiple pending instruction cache requests in the buffer.

Fourth, in the below section entitled "Dynamic Software Controlled Memory Interleaving," along with the associated drawings, describe improved methods and systems to increase available memory bandwidth by striping memory accesses across multiple memory channels. To implement such an optimization, some embodiments a memory controller having multiple channels across which to stripe memory requests. In operation, a memory controller implementing this optimization is to stripe memory requests across the multiple memory channels.

Fifth, in the below section entitled "Eager Response Methodology in Shadow Tag Coherency for Multi-Threaded Cores," along with the associated drawings, describe improved methods and systems to maximize memory throughput by using a shadow tag having multiple concurrent outstanding memory requests. To implement such an optimization, some embodiments include a shadow-tag coherency management unit. In operation, a MTPC implementing this optimization is to manage coherency among the pipelines using a shadow-tag coherency management unit.

Sixth, the below section entitled "Hardware Support for Reductions and Prefix-Scans on a Multi-Threaded Core," along with the associated drawings, describe improved methods and systems for performing reduction operations—i.e., when many data elements are reduced down to one element via some commutative operation—which are commonly encountered and are difficult to efficiently implement using software only. To implement such an optimization, some embodiments include a scheduler to assign multiple threads to perform a reduction.

FIG. 1 is a block diagram illustrating processing components for executing instructions, according to some embodiments. As illustrated, storage 101 stores instruction(s) 103 to be executed. As described further below, in some embodiments, computing system 100 is a multi-threaded processor (MTC) to concurrently process multiple instruction threads.

In operation, the instruction(s) 103 is fetched from storage 101 by fetch circuitry 105. The fetched instruction 107 is decoded by decode circuitry 109, which decodes the fetched instruction 107 into one or more operations. In some embodiments, this decoding includes generating a plurality of micro-operations to be performed by execution circuitry (such as execution circuitry 119). The decode circuit 109 also decodes instruction suffixes and prefixes (if used).

In some embodiments, register renaming, register allocation, and/or scheduling circuit 113 provides functionality for one or more of: 1) renaming logical operand values to physical operand values (e.g., a register alias table in some embodiments), 2) allocating status bits and flags to the decoded instruction, and 3) scheduling the decoded instruction 111 for execution on execution circuitry 119 out of an instruction pool (e.g., using a reservation station in some embodiments).

Registers (register file) and/or memory 115 store data as operands of decoded instruction 111 to be operated on by execution circuitry 119. Exemplary register types include writemask registers, packed data registers, general purpose registers, and floating-point registers, as further described and illustrated below, at least with respect to FIG. 22.

In some embodiments, write back circuit 120 commits the result of the execution of the decoded instruction 111.

Figure 2A:
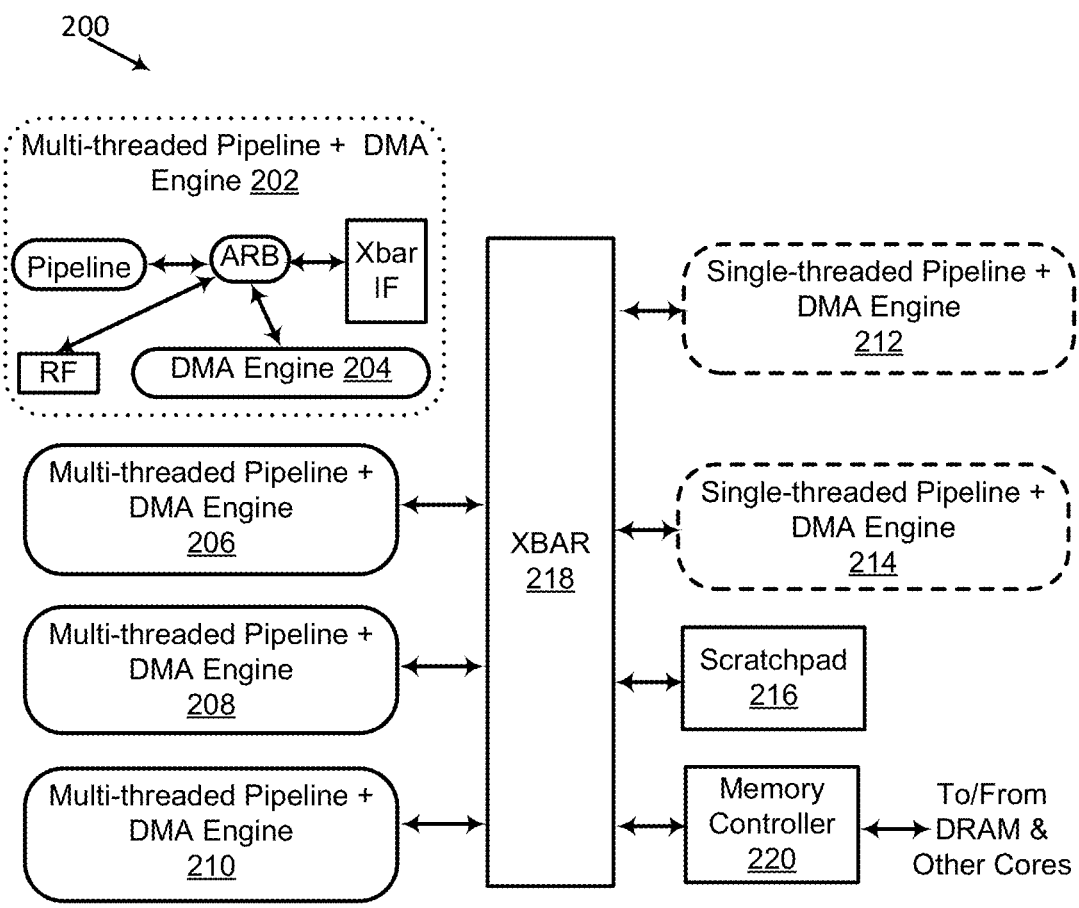
FIG. 2A is a block diagram illustrating a multi-threaded processing core (MTPC), according to some embodiments.

FIG. 2A is a block diagram illustrating a multi-threaded processing (MTP) core, according to some embodiments. As shown, MTP core 200 includes four multi-threaded pipelines, 202, 206, 208, and 210, of which 202 includes an expanded view showing its constituent components: a pipeline, an arbitration (ARB) circuit, a register file (RF), a DMA engine 204 (direct-memory access engine), and a crossbar (Xbar) interface. MTP core 200 further includes scratchpad 216 connecting to other MTP cores and external DRAM, Xbar 218, and memory controller 220, which includes a network interface (not shown). In some embodiments, MTP core 200 further includes single-threaded pipelines 212 and 214. In some embodiments, the multi-threaded pipelines can concurrently handle 16 threads, which, together with the single-threaded pipelines, can concurrently handle 66 threads.

Figure 2B:
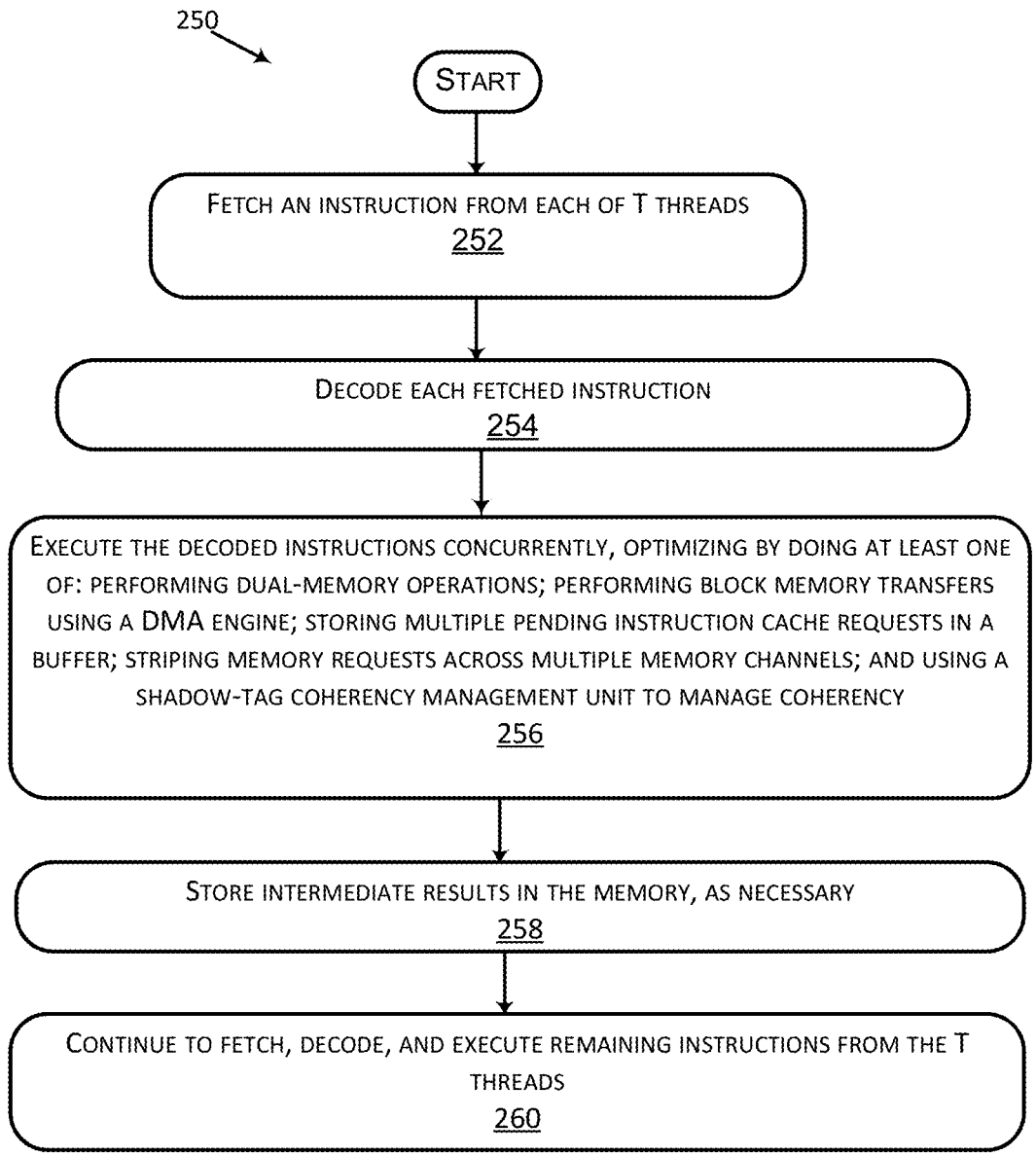
FIG. 2B is a block flow diagram illustrating a method to execute instruction threads by a multi-threaded processing core (MTPC), according to some embodiments.

FIG. 2B is a block flow diagram illustrating a method 250 to execute instruction threads by a multi-threaded processing core (MTPC), according to some embodiments. As shown, the MTPC, after starting, is to fetch an instruction from each of T threads at operation 252. At 254, the MTP is to decode each fetched instruction. At 256, the MTPC is to execute the T decoded instructions concurrently, optimizing by doing at least one of: performing dual-memory operations; performing block memory transfers using a direct memory access (DMA) engine; storing multiple pending instruction cache requests in a buffer; striping memory requests across multiple memory channels; and using a shadow-tag coherency management unit to manage coherency. The MPTC, after executing the decoded instruction, at 258 is to store intermediate results in the memory, as necessary, and at 260 is to continue to fetch, decode, and execute remaining instructions from the T threads.

Dual Memory Operations for Efficient Direct Memory Transactions

Direct Memory Operations and their Uses

Direct memory operations, encompass those that involve data movement between two memory locations and require little compute. To facilitate these operations, an offload direct memory access (DMA) engine, such as DMA engine 204 is to be used. In some embodiments, as here, DMA engine 204 is disposed adjacent to the core pipelines and performs the necessary direct memory operation via loads and stores from a source and to a destination.

DMA engine 204 support a number of different functions. The first is a direct memory copy where the base addresses of the source and destination, the total element count, and size of each element are provided to DMA engine 204. The engine then breaks the operation down into individual loads and stores. In a highly multithreaded architecture, such as that of the disclosed MTP, this operation is especially useful for thread management, as swapping threads involves a bulk copy of thread state from the pipeline register file to a memory location (either scratchpad or DRAM). Populating the pipeline with a new thread state is a bulk copy from memory to the register file.

Additionally, DMA engine 204 can perform operations that require indirect memory access—first fetching a pointer from a pre-built list in memory and then doing either a load or store to that dereferenced pointer location. This functionality is useful for larger operations including broadcasts, gathering from random locations to a packed structure, or scattering from a packed structure to many random locations. These operations are especially useful in graph analytics workloads, where individual vertices may pull (gather) values from their neighbors in the graph to local memory, perform a sequence of operations on the data, and then push (scatter/broadcast) the final value(s) back to their neighbors.

Challenges

While the pipeline-adjacent DMA engine provides a benefit to the programmer through "offloading" of these memory operations and freeing up pipeline resources for other tasks, the latency of the individual memory transactions does not improve over doing loads and stores from the pipeline. In MTP core 200, which in some embodiments is a non-uniform Distributed Global Address Space (DGAS) machine, the latency directly to memory becomes an issue.

Looking up the MTP hierarchy, in some embodiments, MTP core 200 is part of a computing system, the rest of which is not shown, which includes 8 cores per die, 32 dice per socket, and 16 sockets per node, making for a total of 4K (4096) cores and 256K (262,144) threads (270,336 threads when the single-threaded pipelines are included). Each MTP core 200 has a scratchpad 216 and memory controller 220, and all memory locations are accessible by any pipeline in the system.

Consider for example, a bulk memory copy from a DRAM on a remote socket to the "local" DRAM space. From an instruction perspective, the DMA engine first issues a load request to fetch the data from the remote DRAM, returning data to the requesting DMA engine, followed by a store instruction to store the block from the DMA engine to the "local" destination, be it the local scratchpad or the local DRAM. From a latency perspective, the load from a remote socket's DRAM will take hundreds of cycles to return to the DMA engine, storing the data to the local DRAM will take another hundred cycles. In this example, the returning data to the DMA engine before storing to the local destination is unnecessary and is obviated by the dual-memory operations of disclosed embodiments, as described below. Extending the example to a gather operation shows an additional long-latency memory accesses (pointer list access, remote memory load, destination memory store) that does not necessarily need to return to remote DMA engine.

The DMA engine is located near the multi-threaded processor (MTP). The programmer issues a DMA-type of instruction (e.g. dma.copy, dma.scatter, or dma.gather). The pipeline sends this instruction request directly to its adjacent DMA engine, which then decodes the instruction to get the type, source memory, and destination memory. The DMA engine then sends individual load and store requests for each element of the bulk data transfer.

Dual-Memory Operations

The disclosed MTP system, on the other hand, provides more efficient execution of these DMA operations through the support of dual-memory operations in the memory controller at each memory endpoint in the system. By supporting these operations, these indirect accesses and copy-like operations can be executed from memory-to-memory, instead of returning each intermediate step to the remote pipeline or remote DMA engine.

FIG. 3 is a table showing dual-memory operations supported within each memory controller, according to some embodiments. As shown, table 300 includes the indirect load and store operations, their descriptions, the inputs for their invocation, and notes on when they can be issued. These dual-memory operations include indirect loads and stores (pointer referencing), simple load plus store combinations, and a combination of the two (indirect load-store). All operations are single-data element operations. That is, if the DMA engine executes a bulk copy of 'n' elements, it will send out 'n' number of unique dual-memory operation requests to unique addresses.

When the memory controller receives a dual-memory op packet, it will always do a load of the 'i' input, as this is a similarity among all operation types. Following the load, the subsequent packet sent to the next destination will depend on the operation type of the original request. In some embodiments, the original requestor only sends the initial request, the remote memory controllers are responsible for sending the follow-on requests to finish the full dual-memory operation.

Indirect load (IND-LD): The follow-on request will be a regular memory load to the address resulting from the load. The 'source' requestor for the load will be sent as the pipeline or engine that made the original (IND-LD) request, to guarantee that the result of the load will be sent directly to the original requestor.

Indirect store (IND-ST): The follow-on request will be a regular memory store to the address resulting from the load. The 'source' requestor will be sent as the pipeline or engine that made the (IND-ST) request. Any necessary acknowledgement for completion of the store will be sent back to the original requestor.

Load-Store (LD-ST): The follow-on request will be a regular memory store to the address given by the input 'j'. The 'source' address will be sent as the pipeline or engine that made the (IND-ST) request. Any necessary acknowledgement for completion of the store will be sent back to the original requestor.

Indirect Load-Store (IND LD-ST): The follow-on request will be a LD-ST, where the 'i' being sent is address resulting from the load, and 'j' being sent is the destination address passed from the input 'j' given in the original request. The 'source' requestor will be sent as the originator of the (IND LD-ST).

For any operations that use a dereferencing offset to the pointer, the execution unit local to the memory controller (for atomic operations) will be used. The sequence of operations given here will ensure that the full operation properly passes directly to each memory location involved in the copy, gather, scatter or other indirect op. Only the final loaded data value or acknowledgement of successful store will be returned to the original pipeline or DMA engine that made the request.

The MTP instruction set architecture (ISA) also exposes these operations to the programmer to allow for the use of a highly-threaded programming model versus a lower threading+DMA offload model. All of these operations allow for a size specification of the single element (8/16/32/64 bytes) and an optional opcode to apply an atomic operation with the data already held at the destination. This is implemented using a functional unit pre-existing at the interface for the purpose of remote atomic operations.

This method reduces total latency of performing copies, gathers, scatters, and broadcasts when compared with a pipeline or offload engine issuing each individual load and store request associated with each sub-element of the direct memory operation. Latency is reduced by limiting the number of network traversals in a non-uniform memory system to the minimum amount. This method also reduces the amount of information the pipeline-local DMA engine will need to maintain with each outstanding request, loosening the area limitation and allowing for more outstanding requests per operation. Simulation results and analysis are illustrated and described with respect to FIG. 4 and FIG. 5.

For applications such as graph analytics, both highly multi-threaded and offload programming models may be very attractive. On a non-uniform system, direct memory operations may be heavily used, especially for movement of data between vertices, partitioning graphs, and mirroring data between graph partitions. Optimizing performance of these operations is imperative to optimizing the performance of the application overall. These occur many times in all algorithms, and system-wide gathers, scatters, and broadcasts can quickly become the performance bottleneck.

Simulation Results

To assess the potential performance benefit to the gather operation, a simulator written in C code was built which models the gather operation using latency estimations of an embodiment of the MTP. As to the initial setup of the simulation, the location of the pointer list was in the pipeline's local scratchpad, the data elements were located in various DRAM in the system, and the final packed destination was again the local scratchpad.

Figure 4:
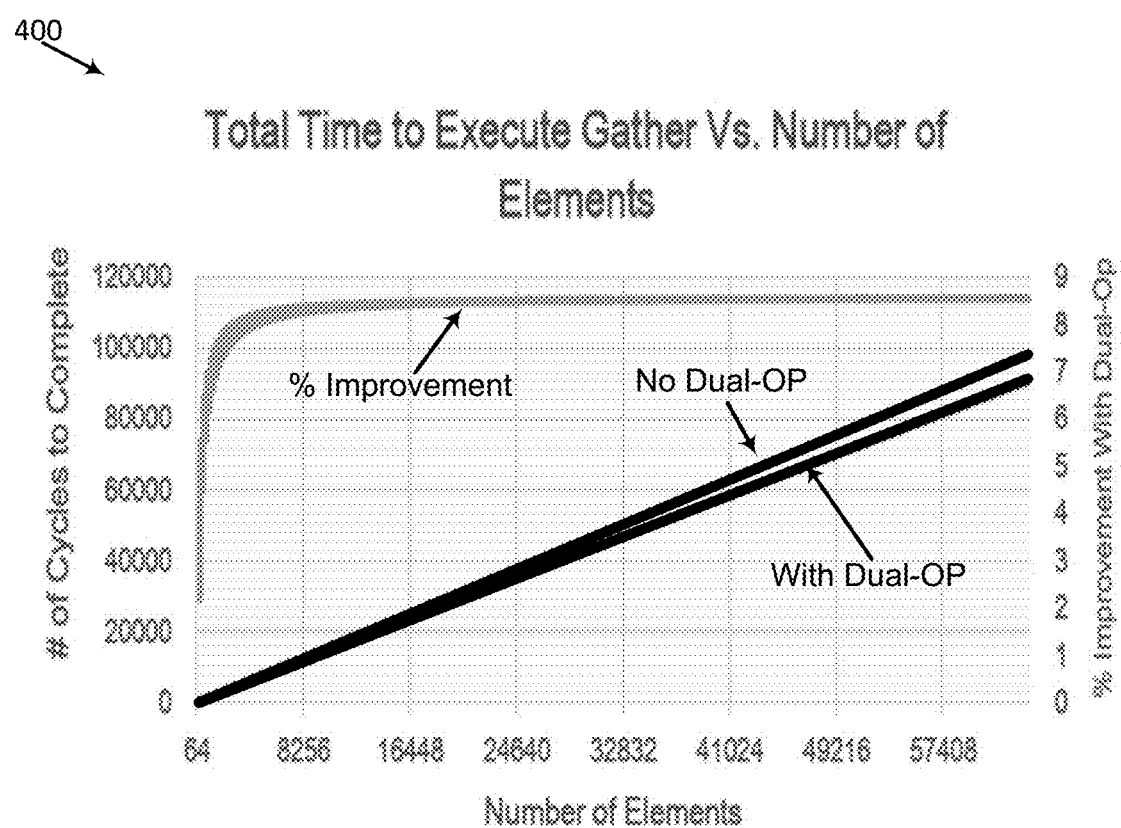
FIG. 4 is a graph showing simulation results comparing total time to execute a gather versus a number of elements.

FIG. 4 is a graph showing simulation results comparing total time to execute a gather versus a number of elements. As shown, graph 400 charts the number of elements to gather versus the number of cycles to complete gather. Graph 400 shows the total aggregate latency of a gather operation performed by the pipeline-adjacent DMA engine both with and without the existence of the dual-op mechanism in the memory controllers. Additionally, graph 400 shows the percent improvement of the dual-op method using a secondary scale on the Y-axis of the plot. Graph 400 shows the total number of 8-byte data elements gathered being scaled from 64 up to 64,000.

As shown in FIG. 4, using the dual-op method is consistently better performing than without. At lower element counts, the improvement was only 2%-3%. However, increasing the number of elements widened the gap, peaking at about 8.5% starting at 16k elements. There are a few details which help to determine just how much better performing the dual-op method is. The first is the number of outstanding requests the DMA engine can handle. If the DMA unit is performing all individual loads and stores for each step of the gather (i.e. list load, data load, packed store), then it must hold all of the information around for each step, limiting the number of outstanding requests due to storage overhead. With the dual-op method, the entire gather sequence is included in the packet, meaning that the DMA engine holds no information other than an identification to associate the acknowledgement of completion with the correct request. This loosens the limitation on the number of outstanding requests and allows for a higher number provided that the network can handle the higher traffic. This possible improvement is not reflected in the figures, instead, both implementations are given an arbitrarily chosen limit of 256 outstanding requests.

The other factor that helps to determine the advantage of using the dual-op method is the memory locations of the sub-operations of the DMA sequence. Because some embodiments of the disclosed MTP have nonuniform latencies in its memory accesses, a choice to place the gather destination in the pipeline's local DRAM instead of the scratchpad can have a great effect on the total latency.

Figure 5:
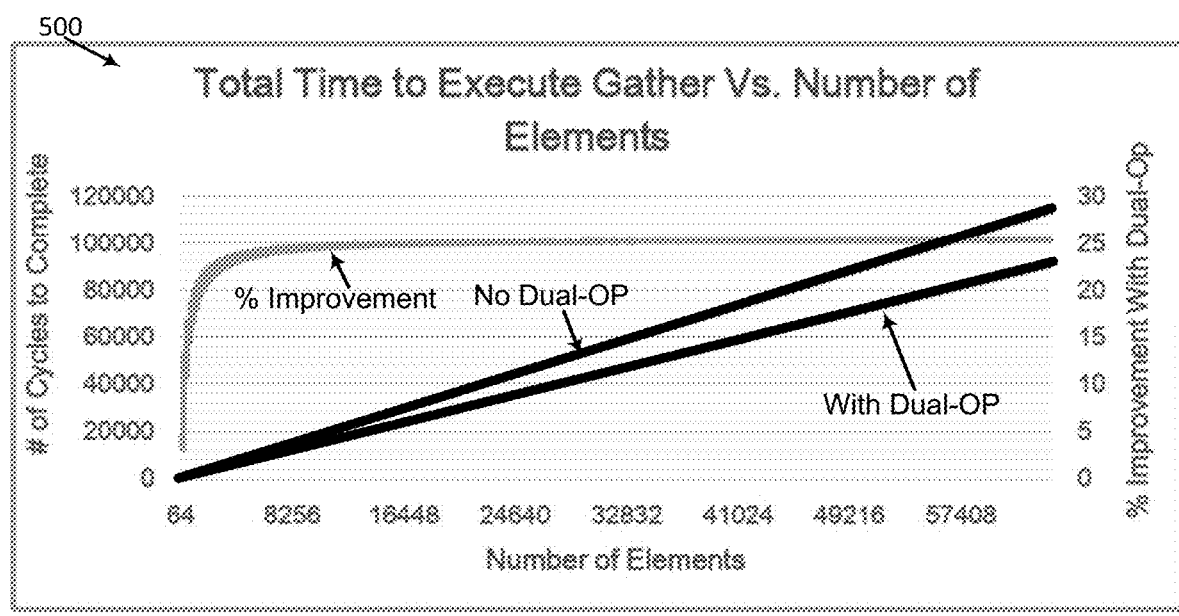
FIG. 5 is a graph showing simulation results illustrating gather time versus number of elements with and without dual-op implementation.

FIG. 5 is another graph showing simulation results comparing total time to execute a gather versus a number of elements. As shown, graph 500 reflects the same analysis done as was don't to generate graph 400 (FIG. 4), except that now the gather destination is in local DRAM instead of the scratchpad. The longer latency DRAM access time has a significant effect on the total latency of the operation in both cases, however, it has a much more detrimental impact when each operation needs to perform roundtrip network traversals to/from the pipeline-adjacent DMA engine. As shown by graph 500, at its peak, starting around 8K elements, the dual-op method shows more than a 25% performance improvement versus the case without it.

Approach to Efficiently Handle Instruction Cache Misses

As described above, each multi-threaded processor (MTP) sometimes executes multiple, say 16, threads concurrently, and each thread accesses one common instruction cache. This creates unique challenges, including, for example, handling the instruction cache misses from all threads. The pressure points not only come from the MTP but also from the back pressure of the network. By improved handling of instruction cache misses, the multi-threaded processor (MTP) of disclosed embodiments is expected to achieve improvements in processing efficiency as compared to existing platforms.

Compared to its predecessor, it adds new features, including the multi-threaded pipeline (MTP). In some embodiments, The MTP is barrel multithreaded, meaning that each thread may have only one instruction in the pipeline at a time, to avoid any need to hazard detection between instructions within a thread. No dependencies exist between threads.

Disclosed embodiments improve the instruction cache inside the MTP in at least five areas:
1) Streamlining requests from all threads;
2) Storing miss requests for in-order processing;
3) Processing out of order data returns;
4) Responding to multiple threads requesting the same cache line and
5) Special handling on incoming requests during response stage.

Disclosed embodiments develop a tracking system that is power and area conscious to address in-order requests and out-of-order responses to the instruction cache. Additionally, disclosed embodiments employ an additional mechanism to ensure responses to multiple threads are handled efficiently. During the response stage, disclosed embodiments further coordinate with incoming requests to minimize unnecessary fetches from the main memory.

The microarchitecture of the disclosed multi-threaded processor (MTP) develops a simple way to store and track data flow at various pressure points. Requests that go out to the main memory are moved to a buffer. This buffer saves the system address information that is used for the cache line to be loaded from the main memory. At the same time, disclosed MTP embodiments utilize an in-order queue to store the index of the buffer entry. For responses that are returned out-of-order, the disclosed MTP uses another queue to push the deallocated index so that it is easy to discover the available slot on a new outgoing request. If multiple threads have requested the same cache line, the same data will be returned to each thread. While this is happening, additional response data may continue to arrive for other outstanding entries. In this case, data is stored into the cache as usual, but the entry index is saved onto a response tracking FIFO. De-allocation happens when the previous response concludes. In addition, whenever return data is received, incoming requests are delayed from processing until cache has been updated. The buffer supports out-of-order execution by enqueuing and dequeuing instruction cache requests in order, while allowing enqueued instruction cache requests to be serviced out-of-order. Essentially, the buffer allows for out-of-order response based on the return order of the outstanding cache line requests (which were made in order). The barrel multi-threading architecture of the MTP allows for the out-of-order responses.

Disclosed embodiments use a straightforward mechanism to organize a complex data path. The implementation is power and area conscious compared to other methods.

The use of queue structures to track minimal information reduces the area overhead. It also simplifies the logic from comparing each entry to find the desired information at each turn of events. This can result in power savings. Within a system, stalling can occur frequently due to the nature of operating on multiple threads, a combination of hit and miss scenarios, as well as network congestion. This micro-architecture prevents data loss through all possible interruptions.

Figure 6:
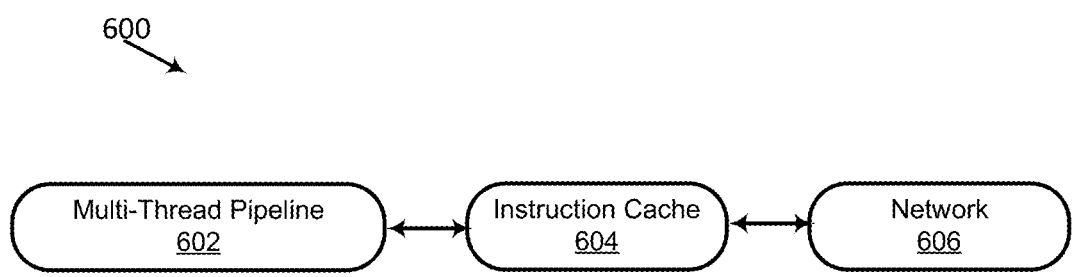
FIG. 6 is a block diagram illustrating a system including a multi-threaded pipeline to execute instructions, according to some embodiments.

FIG. 6 illustrates a simple way of viewing the system. As shown, system 600 includes multi-threaded pipeline 602, instruction cache 604, and network 606. In operation, the pressure points in this system occur on the interfaces. Network 606 can apply backpressure due to traffic congestion. Within instruction cache 604, various factors can impact its ability to continuously process requests from multi-threaded pipeline 602. Details on pressure alleviation are discussed below.

Figure 7:
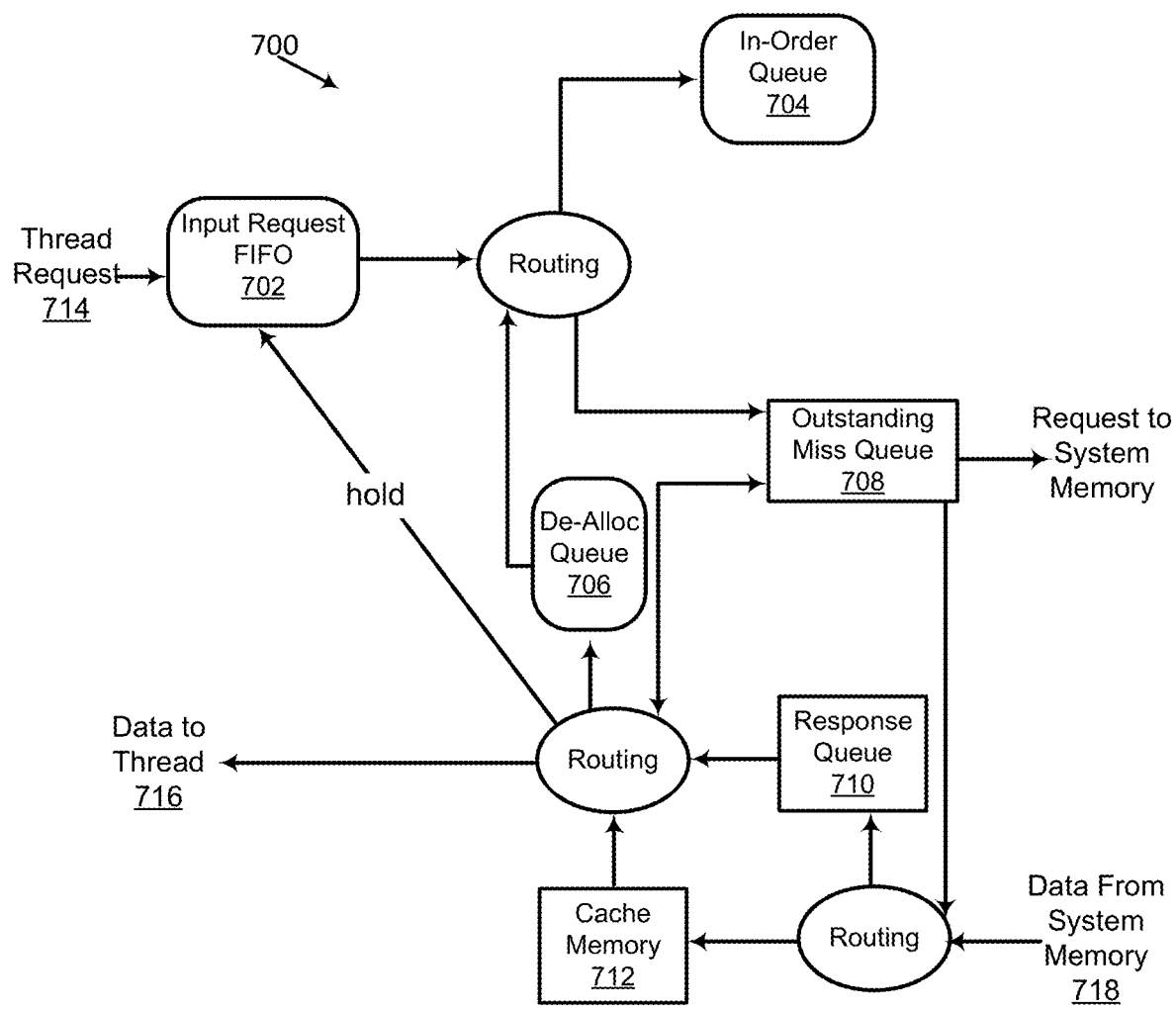
FIG. 7 is a block diagram illustrating a memory controller to receive and respond to requests from threads, according to some embodiments.

FIG. 7 is a block diagram illustrating a memory controller to receive and respond to requests from threads, according to some embodiments. As shown, memory controller 700 includes input request FIFO 702, in-order queue 704, de-allocation queue (DAQ) 706, outstanding miss queue 708, response queue 710 (RSPQ), and cache memory 712. In operation, normally, a cache hit will see a data result from interface 716 within minimal latency. However, when the output port is busy servicing a previous cache miss with returned data, including for example data from system memory arriving on interface 718, this can throttle the input request interface 714. To allow progress from the threads and be ready for faster turnaround time, requests are queued in request FIFO 702.

As illustrated in FIG. 7, aside from the input queue, there are three other FIFOs, 704, 706, and 708, to keep track of data movement in case of a cache miss. The FIFOs store the index of the Outstanding Miss Queue 708 (OMQ). When a request results in a miss, the requested memory address along with its transaction ID is saved to OMQ 708. To find an available slot in the queue, the memory controller pops the head of de-allocation queue 706 (DAQ). As the entry is being stored, the slot index is added to the in-order queue 704 (IOQ). Outgoing requests to the system memory are generated in the order they arrive in the IOQ.

Some systems, such as graph analytics systems, requires large memory capacity. It is typical to have a system memory partitioned across multiple physical boundaries to support extended capacity. Given that the disclosed MTP has a distributed global address space with non-uniform memory access latencies, responses from the system memory may return out of order due to latency in the network. Hence, DAQ 706 is needed to keep track of deallocated entry index to quickly find an available slot for the next miss request.

When a response returns, it is stored to the cache memory at the same time returned to the requesting thread. This normally happens within minimal latency. However, if multiple threads have requested the same cache line, data will be returned to each thread. This will take multiple cycles. Hence, occupying the only output port of the instruction cache for longer time. This will potentially block incoming thread requests that result in a Hit or other data returned from the system memory. To alleviate this situation in each case, the following mechanism is used. For incoming requests, they are stored in the input queue and held off from draining until cache is updated. This also ensures new requests will get the updated cache line and reduces unnecessary cache miss. For responses, the data will be written back to the cache memory immediately while the return-to-thread is "remembered" for later processing. To do so, it will require a lookup of the OMQ 708 to find the original memory address before storing it to the correct location in the cache. This lookup will generate the slot index, which is in turn pushed to RSPQ 710. The entry in the OMQ, however, is not deallocated until RSPQ is popped.

Reduction Operations on Multi-Threaded Machines

As described above, reduction operations—i.e., when many data elements are reduced down to one element via some commutative operation—are commonly encountered and are difficult to efficiently implement using software only. In the graph application space, reduction operations exist across many different algorithms. One of these applications is Triangle Counting, which counts the number of vertex triangles that exist in a given graph.

A basic exemplary pseudo-code snippet is shown in FIG. 8, which is pseudo-code a triangle counting algorithm using a reduction operation on every iteration. As shown in pseudocode 800, each iteration of the loop is a vertex in the graph which is to compute the number of triangles that it is a point of. At the end of the iteration, that thread is to add its value onto the running accumulation among all of the vertices.

If this example is implemented using a multi-threaded programing model, each iteration could be its own thread. All threads may perform their local triangle count in parallel and then contribute their value to the running total. The final, fully reduced 'ntriangles' value must be known before the program can proceed.

Reductions can be implemented in software with alternate, inferior approaches. The accumulation portion of each iteration could be an atomic add on the data value. This method could exhibit poor performance depending on the number of threads contending for the atomic lock, and the overhead of accessing memory directly or managing the atomicity through the caches and coherency. Alternatively, the programmer could construct a k-ary tree between threads, optimizing for the underlying hardware and more efficiently using network and memory bandwidth. This presents significant programming overhead and is less effective than a single hardware core that is highly multi-threaded.

Accordingly, a hardware approach with minimal programming overhead is described and offers an optimal choice for maximizing performance of reduction operations in a multi-threaded core. A disclosed embodiment performs a reduction by using multiple hardware threads to perform a commutative arithmetic operation on multiple elements of a vector and atomically accumulate the result of each of the operations in a running total. By managing the atomicity, performing the operation, and providing the final value from all threads once the operation has concluded, the hardware improves performance of the reduction operation while also loosening the programming burden.

This invention proposes hardware reduction and prefix-scan support for a multi-threaded core. This is achieved by using small engines at two levels of a core consisting of multiple multi-threaded pipelines. With an initial software configuration of the count of participating threads, the engines track the current count of the operation and notify the pipelines of the status. Unique features of this approach include placing engines at both the pipeline and core level to provide quick response to status polling, allowing for programmability of the response mechanism (poll or push), and providing support for multiple concurrent reductions and any number of participants within the core. Managing the ordered elements of the prefix scan reduces software complexity.

Hardware management of reductions provides improved performance compared to the software-only method of atomically writing values to a single memory location. Managing the ordered elements of the prefix scan operations also reduces software complexity. Finally, this method reduces the amount of software configuration overhead versus past hardware-assisted techniques that required configuration of a k-ary tree.

Barriers in a Large Scale Multi-Threaded System

Reductions and Prefix Scans in a Large Scale Multi-Threaded System

For a system with many multi-threaded cores, hardware reduction and prefix scan implementations need to be scalable to thousands of threads yet efficient enough at a local level such that programming overhead does not outweigh any possible performance benefit. In some embodiments, the multi-threaded processor (MTP) of disclosed embodiments is a multi-threaded machine with a distinct hierarchy.

Figure 9:
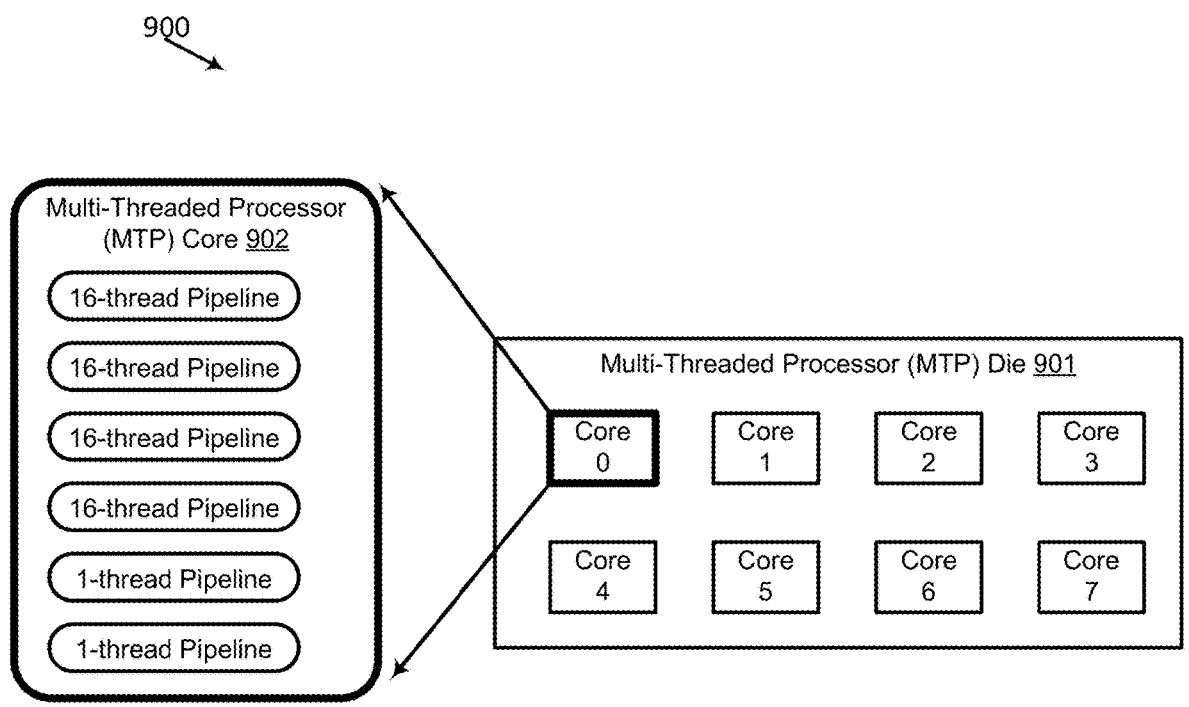
FIG. 9 is a block diagram illustrating hierarchical groups of threads in a MTP core, according to some embodiments.

FIG. 9 is a block diagram illustrating hierarchical groups of threads in a multi-threaded processor (MTP) core, according to some embodiments. As shown in system 900, the most basic building blocks of MTP 901 are the 16 thread multi-threaded pipelines (MTP) and the single threaded pipelines (STP). Each MTP core 902 consists of four multi-threaded pipelines and two single-threaded pipelines, meaning that each core can support up to 66 hardware threads.

The next levels of the disclosed MTP hierarchy are as follows. There are eight MTP cores per die, 32 dies per socket, and 16 sockets per node. With over 256,000 threads per node in what could be a multi-node system, global reductions and prefix-scans across the system become a significant performance issue. The approaches to global reductions versus those that will be executed only within one MTP core will be different. The scope of some disclosed embodiments will focus only on reductions and prefix-scans that are performed only within a single MTP core.

Multi-Threaded Processor (MTP) Organization for Reductions and Prefix Scans

Figure 10:
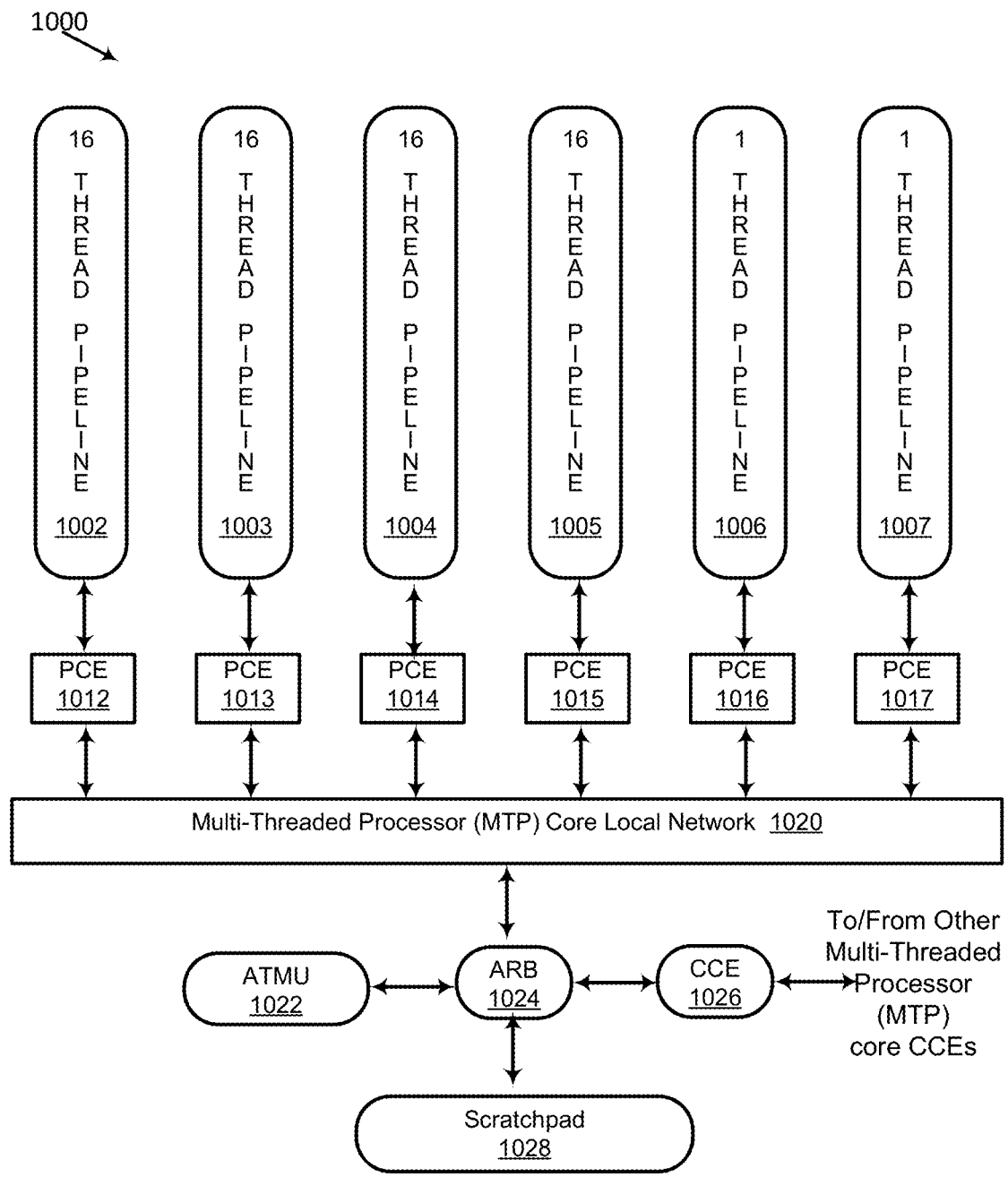
FIG. 10 is a block diagram illustrating a pipeline collective engine (PCE) and core collective engine (PCE) connections, according to some embodiments.

For reductions that exist only between threads at the MTP pipeline or core level, one goal of many goals is to provide synchronization as efficiently as possible. To do this, reduction groups are tracked at each level of the hierarchy using collective engines. As shown in FIG. 10.

FIG. 10 is a block diagram illustrating a pipeline collective engine (PCE) and core collective engine (PCE) connections, according to some embodiments. As shown, MTP system 1000 includes four 16-thread pipelines, 1002, 1003, 1004, and 1005, and two single-thread pipelines 1006 and 1007. The six pipelines are connected to pipeline collective engines 1012, 1013, 1014, 1015, 1016, and 1017, respectively. Each pipeline will use its associated pipeline collective engine (PCE) to provide fast responses to poll instructions. Each PCE will store only the status and final data values for the reduction op. At the core level core collective engine 1026 (CCE) is to synchronize between pipelines and perform the operation on the data. CCE 1026 utilizes a local atomic unit 1022 (ATMU) ALU/FPU that exists next to the local scratchpad 1028 for remote atomic operations to perform its operations. Arbitration circuitry, ARM 1024, manages access to scratchpad 1028 by ATMU 1022, CCE 1026, and the MTP core local network. Messages (data and op type) sent between the PCEs and the CCE will pass through MTP core local network 1020. For operations that extend past the core level, CCE 1026 is to communicate with CCEs in other participating cores. The implementation for this scale of reductions is outside of the scope of this disclosure.

All PCEs and CCEs have the ability to track multiple reduction operation IDs. If different groups of threads within the core have different collectives occurring, all are to be tracked concurrently. For example, eight different collective groups can all exist and be referenced with unique operation IDs by the programmer. There is no dependency between collective groups and all will be serviced in parallel.

FIG. 11 is a table listing machine instructions to support reductions, according to some embodiments. To expose the reduction functionality to the programmer, machine instructions are available in the instruction set architecture (ISA). As shown in table 1100, the basic one data element reduction operations supported are max, min, add, mul, each with the option of unsigned, signed, or float. A variety of bitops are also supported. Exposing these operations in the ISA, instead of having them configured in machine specific registers (MSRs) at initialization time of the collective, allows for the re-use of the collective ID configuration without having to re-configure. This will require the programmer to knowingly use the same reduction op instruction for all references to that collective ID for the extent of the operation.

In addition to the single data element reduction operations, the collective engines support instructions that mirror the MPI_MAXLOC and MPI_MINLOC functions. In these, the running maximum or minimum value is kept as well as an index value attached to who contributed the data. Adding this support requires an extra field of storage to keep the identifier. It also requires the programmer to submit the index value with the instruction. This must be given by the programmer, as associating a hardware-based thread ID would limit the number of participants to 66, which is the maximum number of concurrent threads in the MTP core.

Configurability of participants is provided through targeted stores to machine specific registers (MSRs). The MSRs in the CCE associated with each reduction operation are shown in FIG. 12, which is a table listing core collective engine MSR entries that exist for each reduction configuration, according to some embodiments. The MSRs listed in table 1200 illustrated in FIG. 12 exist in the address map of the MTP system, and each PCE and CCE have MSR space available to support multiple different collective configurations. Each subset of the MSR space corresponds to a unique configuration ID. Configuration involves individual store instructions to the CCE MSR to set the number of participating threads in the core, the poll/push return option, and to enable the operation.

To begin configuration of the reduction, the software must first do a directed store to the CONFIG_COUNT, ENABLE, and MODE MSRs. The count must be set so that the CCE will know once all participants have contributed to the reduction. The ENABLE bit will signify whether the core collective engine is properly configured and ready to accept reduce.* instructions from threads. The MODE bit will select between the push or poll notification methods.

Once the count MSRs are configured, participating threads will call into the CCE using a 'reduce.*' machine instruction detailed in FIG. 11. As previously mentioned, the programmer needs to use the same reduce operation instruction for all participants. For each instruction that the CCE receives it will increment the ACTIVE_COUNT. Take the current data value in the DATA_1 MSR and perform the operation with the input data. The operation is performed by sending a request to the ALU/FPU within the atomic unit (ATMU—1022, FIG. 10). During this time, the available data in DATA_1 is locked. To ensure atomicity of the reduced data, multiple back-to-back requests to the CCE to perform reduction operations on the same ID will be queued up while each operation finishes.

Once ACTIVE_COUNT=CONFIG_COUNT, the CCE will respond to each PCE with an indication that all participants have contributed to the reduction operation along with the final reduced value. If the notification method has been configured as a push, an alert will be triggered by the CCE via an interrupt mechanism that the operation with the assigned ID has been completed. To configure this method correctly, the programmer must write the start PC of the interrupt vector to the PUSH_VECTOR_PC MSR, and the ID of the desired thread to run the interrupt will be programmed to the PUSH_TARGET_TID MSR.

If the notification method has been configured as a poll method, the participating threads may periodically send 'reduce.poll' instructions to the local PCE. Because the PCE is aware of the status via its own DONE MSR and has the data locally, it can respond quickly to poll inquiries. Once the reduction has been reached by all participants, for each successful poll the PCE will alert the CCE, which will then decrement the ACTIVE_COUNT. Once the count returns to zero, the CCE will clear its DATA_1 and DATA_2 registers, de-assert its DONE register, and alert the PCE to de-assert theirs as well. At this point the ID slot is ready to begin the next operation. The CONFIG_COUNT, ENABLE, MODE, PUSH_VECTOR_PC, and PUSH_TARGET_TID MSRs will not be reset, allowing the programmer to use the same collective ID without any re-configuration.

Multi-Threaded Processor (MTP) Support for Prefix Scans

FIG. 13 is a table listing MTP support for prefix scan instructions, according to some embodiments. As shown, table 1300 describes prefix wait, poll, sum, and multiply instructions. Support of the prefix scan involves hardware management of the ordered data buffer of the scan elements. The programmer is responsible for populating the buffer in the local scratchpad in the desired order that they wish the scan to be performed. Once the buffer has been properly constructed, the prefix.sum or prefix.mul instruction are to be sent to the CCE along with the base address of the buffer. The CCE (e.g. 1026 of FIG. 10) is then to pull out each element of the buffer in order, compute its scan value, and place each result in the same order that is was pulled from the buffer. Once the scan operation has completed, the CCE (e.g. 1026 of FIG. 10) is to alert the PCEs of completion. The MSR configuration for the prefix scan operation is similar to reductions. The CONFIG_COUNT must be set as the total number of elements in the buffer, the CCE will then increment ACTIVE_COUNT as it pulls each successive element out of the prefix buffer and know that the operation has completed once the counts are equal. The CCE can also notify of conclusion via a push or poll method similar to the reduction operations. Once notified, the programmer is then responsible for reading the final values from memory.

Dynamic Software Controlled Memory Interleaving

As described above, in order to increase the available memory bandwidth, one technique is to increase the number of memory channels. To avoid hot spots in accessing the memory channels, it is often required that the accesses be spread across the memory channels to avail the full bandwidth. In some systems, this striping of addresses across the memory channels is either fixed or configured at boot by the system software or BIOS.

However, based on the application and the data structure, it is often beneficial to control the address striping based on the data structure. Disclosed embodiments provide a mechanism wherein 2 bits are to be included as part of a physical memory address, to be used to choose the striping mechanism. The 2 bits provide a hierarchical striping mechanism that allows the address to be sent local to a particular memory channel, to a collection of memory channels within a socket or across all the memory channels in the socket.

Some alternative, inferior approaches use a fixed striping granularity or a striping mechanism that is configured at system boot. However, the same striping granularity is not always optimal for different data structures. Disclosed embodiments, by providing the software a mechanism to express the desired striping allows a better co-location of compute and data.

According to some embodiments, the basic idea is to provide 2 bits as part of the physical address, that software can set per access to vary the striping granularity. This is done in conjunction with the route table, which selects a different striping granularity based on the 2 bits in the address.

Figure 14A:
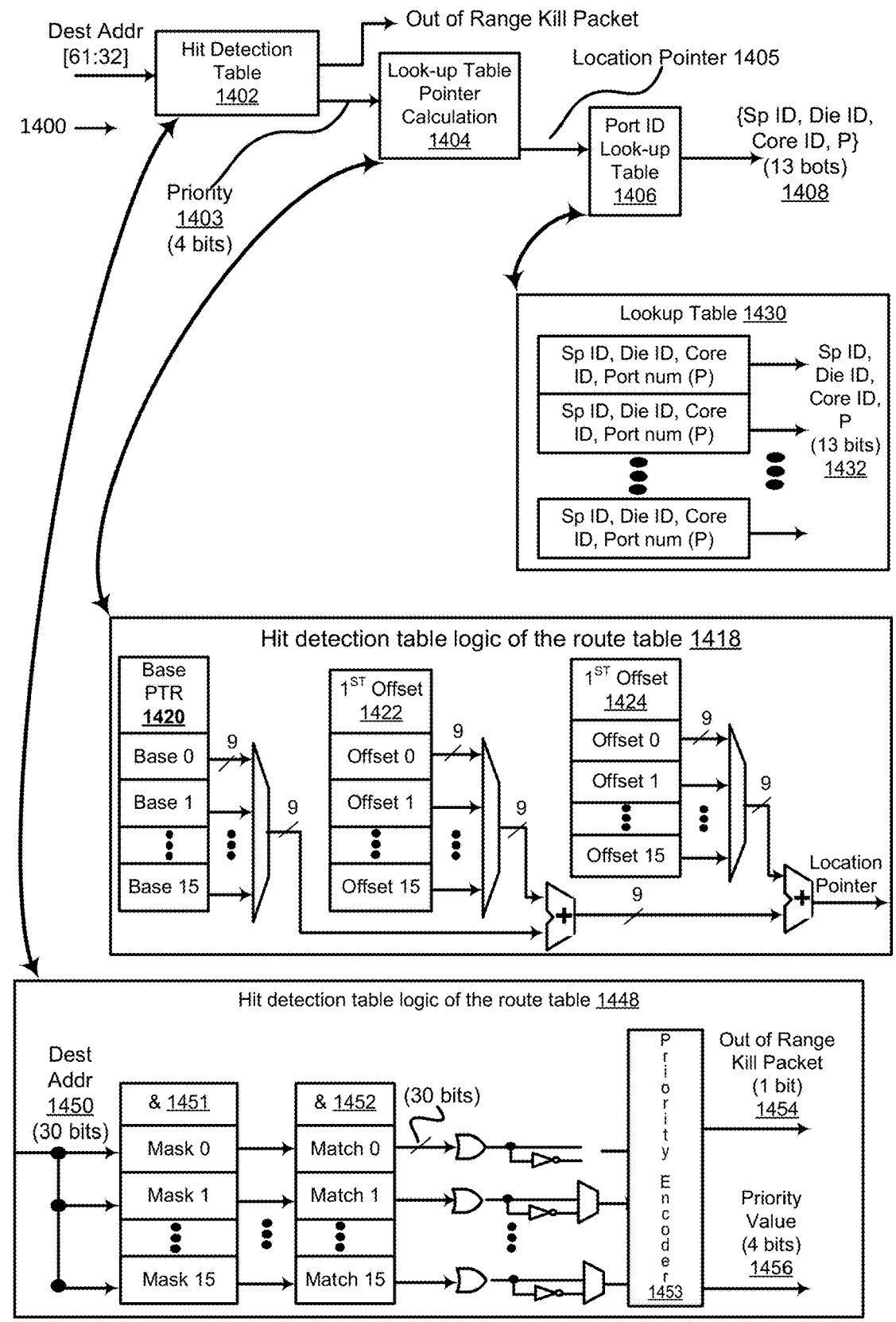
FIG. 14A is a block diagram illustrating a route table, according to some embodiments.

The striping based on the address bit is performed at the route table. FIG. 14A is a block diagram illustrating a route table, according to some embodiments. As shown, route table 1400 is a hardware route table that includes hit detection table 1402 (an enlarged version of which is shown as 1448), look-up table pointer calculation 1404 (an enlarged version of which is shown as 1418), and port ID lookup table 1406 (an enlarged version of which is shown as 1430). In operation, route table 1400 is to determine which memory controller channel the request is to be routed to.

Figure 14B:
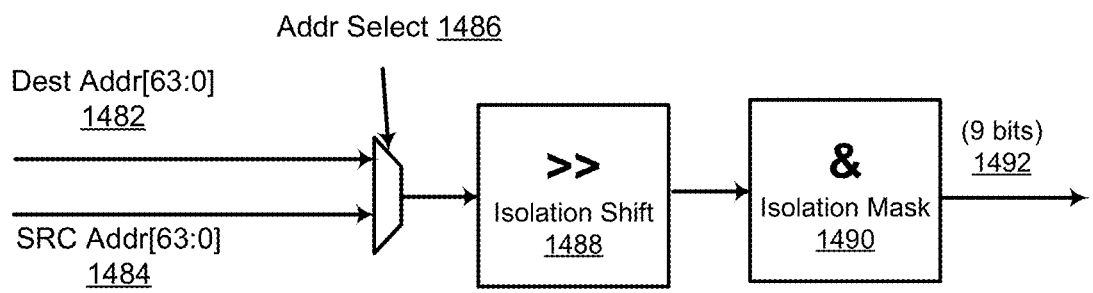
FIG. 14B is a block diagram illustrating an offset calculation, according to some embodiments.

The hit detection table 1402 (as enlarged at 1448) shown in FIG. 14A is used to detect the address range and the corresponding pointer for the look-up table pointer calculation. The look-up table shown in FIG. 14A consists of the memory channel ports arranged into separate groups of channels. The base pointer in the look-up table pointer calculation selects the group and the offset calculation, as shown in FIG. 14B, selects the correct output in the group of channels. The 2 bits in the address are used to select different offset types and thereby providing different striping granularities by varying the look-up table pointer.

Eager Response Methodology in Shadow Tag Coherency for Multi-Threaded Cores

As described above, some SMT processors attempt to maximize memory throughput by having multiple concurrent outstanding memory requests, which means the hardware must efficiently keep track of them. For maintaining core level shadow tag coherency among the various pipelines, the coherency management unit needs to handle several outstanding requests with low latency in order to effectively saturate the memory bandwidth and maximize performance.

When a shadow tag-based coherency system is extended further to the die-level, this problem gets exacerbated and the penalty due to coherency is a high percent of the total miss penalty as the tag reads being single port register file, an embedded building block (EBB). EBB reads get effectively serialized and the throughput of the coherency unit is thus severely reduced.

In addition, EBB read power is also an important concern in shadow tag coherency as on a cache miss, all tag EBBs of all ways may need to be read to check if any other cache has the same line.

Some previous approaches of the shadow tag coherency implementation initiate a read of the tag array EBBs on each transaction which reduces the throughput to (Number of memory ports supported by the Tag Array)/(Number of parallel requesting caches).

Other previous approaches to bridge the throughput gap is to increase the number of ports for the tag array EBB. Another method used is to change the EBB organization, which helps increase throughput in certain scenarios and can be coupled with the solution presented herein to further increase throughput of coherency transactions processed.

Due to area advantages generally, single port EBBs are preferred and using the prior approach of reading tag arrays on each transaction reduces throughput severely.

The alternate approach of using multi-port register file EBBs have area disadvantages. The previous technique of changing the EBB organization can increase coherency processing throughput with some area penalty and logic complexity and it can be coupled with the techniques presented herein to further increase throughput. Also, none of these approaches can hide the additional overhead latency of the coherency which is also achieved in the techniques described herein.

The Eager Response methodology has 3 main components: (1) Eager Coherency Response; (2) Pipelined Coherency based on blocking certain indexes; and (3) Eager Pre-response fetch. Eager Coherency Response pre-reads the state arrays to generate an early coherency response without any tag reads whenever possible. Pipelined coherency identifies multiple coherency transactions belonging to different cache indexes and parallelizes their processing. Eager Pre-Response fetch hides the coherency latency by doing Eager fetch from memory which can be later discarded, if needed, after receiving the response from the shadow tag coherency management unit. The Eager Response Methodology/Scheme is a latency reduction technique that exploits properties of coherency in order to reduce the coherency latency overhead. The Data Cache and the Core Level Shadow tag blocks both jointly implement the Eager Response Methodology. The Core Level Shadow tag performs the Eager Coherency Prefetch and Pipelined coherency while the D-cache performs the Eager Pre-response fetch)

The scheme uses the 3 above features to hide or reduce the coherency penalty and provide a high throughput coherency transaction response. By initial estimates of some embodiments of the MTP, the average wait time for any coherence transaction even at peak load/store traffic does not exceed 20 cycles at core level, and this can be hidden in many scenarios as outlined above to provide no additional penalty due to enablement of cache coherence in such scenarios.

In addition to the performance improvement, as tag array EBB reads are minimized and sometimes avoided with the Eager Coherency Response, this contributes to a significant power reduction by avoiding the parallel read of multiple shadow tag EBBs (in this case, 24 shadow tag EBBS per MTP Core) unless necessary.

Shadow-Tag Coherency Management Unit

As mentioned above, multi-threaded cores aiming to maximize memory throughput by having multiple concurrent outstanding memory requests. For maintaining core level coherency among the various pipelines, the core level shadow tag coherency management unit needs to handle several outstanding requests with low latency in order to effectively saturate the memory bandwidth and maximize performance.

The Eager Response methodology has 3 main components: (1) Eager Coherency Response; (2) Pipelined Coherency based on blocking certain indexes; and (3) Eager Pre-response fetch.

At the level of the shadow tag, the Eager Response Engine uses the state array of the coherency pre-calculate the response of the coherence transaction without having to read the shadow tag structure. This is done in parallel for each requesting data cache and thus in these cases it achieves the theoretical maximum possible throughput of coherency transactions. If it is unable to pre-calculate, it utilizes the shadow tag's coherency pipeline instead. The shadow tag's coherency pipeline computes multiple coherency transactions in parallel as long as they do not modify the same cache-line index. This is achieved through the use of a blocked index vector to keep track of indexes being processed and permits parallel processing of coherency transactions while maintaining correctness The third component is the Eager Pre-response fetch where the D-cache initiates an Eager memory load of the source memory cache line on a cache miss, before the response from the shadow tag is received. If the shadow tag decides to initiate a cache-to-cache transfer instead, as indicated in the response from the shadow tag coherency management unit and in that case the pre-fetched data from the memory is discarded. This feature is controlled by a 1-bit software write-able register and can be turned off by software in case of applications with high bandwidth utilization.

Previous approaches of the shadow tag coherency implementation initiate a read of the tag array EBBs on every transaction which reduces the throughput to (Number of memory ports supported by the Tag Array)/(Number of parallel requesting caches). Using the above mentioned Eager Response Methodology in the MTP core with 6 pipelines, it can potentially provide up to 6× throughput improvement and a 67% latency reduction in best case for each coherency transaction, considerably boosting the overall performance.

Core-Level Shadow Tag Coherency Management Unit

The shadow tag is the block that manages the coherency between the caches in the domain. The shadow tag has duplicate copies of the tag arrays of all caches in the domain and tracks the particular state of each line in the cache. When a cache receives a read or write request that initiates a coherency request/state transition, it must first send the coherency request to the shadow tag. The shadow tag will then check to see if there are any owners/sharers of the cache line being requested, and initiate actions to the other caches, if necessary. These actions may be telling other caches to invalidate their lines, telling them to forward the data (over the xbar in the attached visio drawing), or telling them to simply transition their local state (ex. go from modified to owned). In processing a coherency request, the shadow tag will also always update its local tag/state information.

The core level shadow tag is the management block for the coherency between the pipelines in the MTP core. The shadow tag contains copies of all tags in the coherent domain and their current states. On a coherency request from one of the pipeline's data caches, the shadow tag will do a read of all active tags. Based on the result of the tag read and compare, the shadow tag will initiate the movement of data between caches or the invalidation of cache lines in other sharing caches. The data movement is done through the local network, where the sending cache initiates a data store request to the receiving cache.

Figure 15:
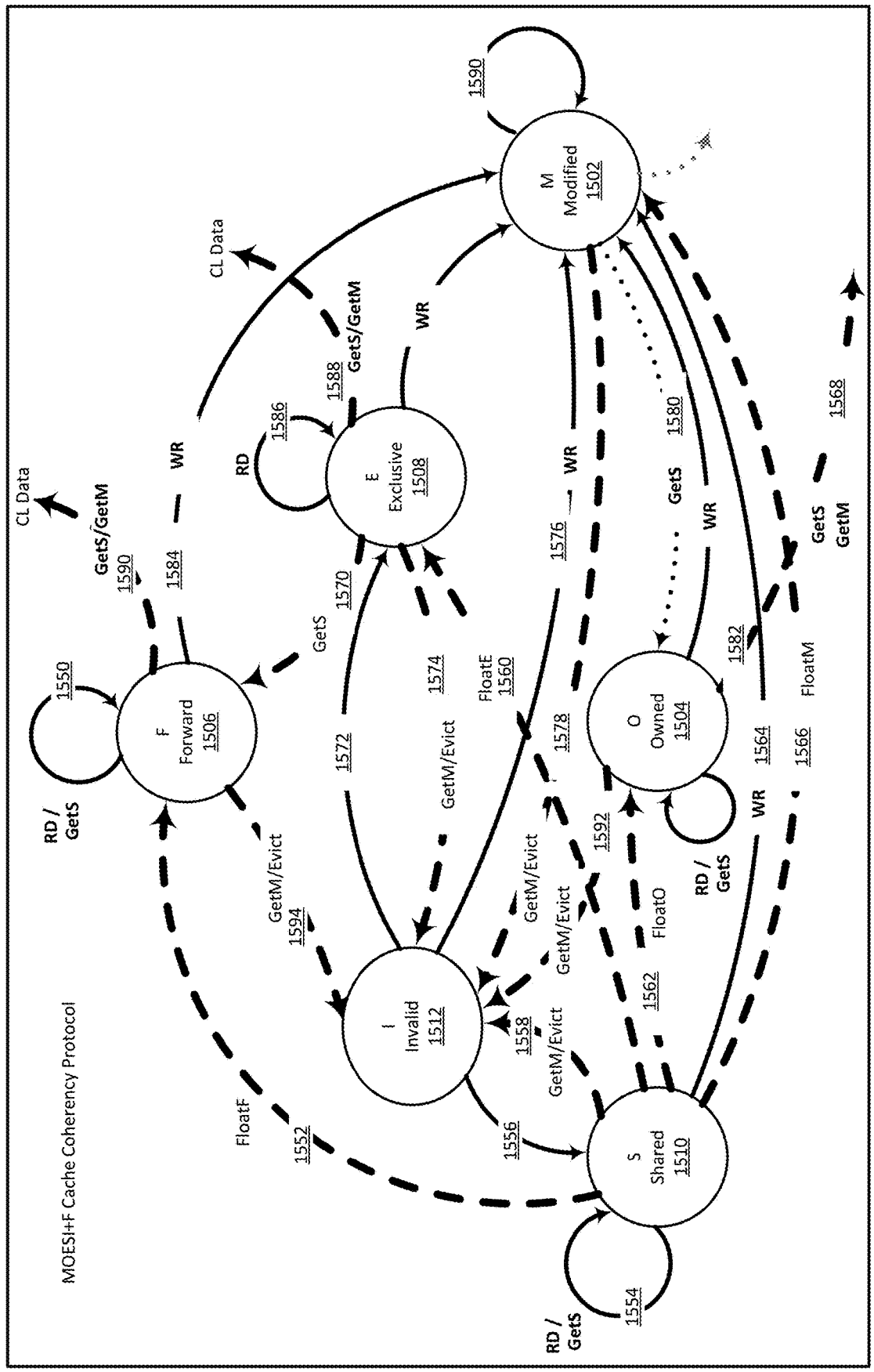
FIG. 15 illustrates a state flow diagram for the MOESIF (Modified Owned Exclusive Shared Invalid Forward) cache coherency protocol, according to some embodiments.

The data movement in some embodiments uses the F (Modified Owned Exclusive Shared Invalid Forward) Coherency Protocol shown in FIG. 15, which is a block diagram illustrating MOESIF Coherency Protocol State Transitions, according to some embodiments.

Based on the state transitions, FIG. 16 illustrates a list of the commands that need to be sent to support these state transitions from the shadow tag coherency management unit to the cache and vice versa. FIG. 16 is a table listing commands from the D-cache to the Shadow Tag Coherency Management Unit, according to some embodiments. FIG. 17 is a table listing commands from the Shadow Tag Coherency Management Unit to the D-Cache, according to some embodiments.

FIG. 15 illustrates a state flow diagram for the disclosed cache coherency protocol, according to an embodiment. The states included are M Modified 1502, O Owned 1504, F Forward 1506, E Exclusive 1508, S Shared 1510, and I Invalid 1512.

As shown, cache line data responses to read ("GetS") or write ("GetM") requests can come from caches in the E, F, O, or M states, via routes 1570, 1574, and 1578 from the E state, route 1590 from the F state, routes 1582 and 1592 from the O state, and route 1578 from the M state. Because the protocol dictates that only one cache can exist. In these states for each line, it is ensured that there is always a single responder for either type of request.

There are two states where an eviction of the cache line will leave only caches in the S state: F and O. For these cases we propose a method of passing the state to one of the sharing caches, continuously ensuring that one cache will always serve as a designated responder. These are represented in FIG. 15 using the transitions from the S state labeled "FloatO 1562", "FloatF 1552", "FloatE 1560", and "FloatM 1566".

For example, consider the case where 3 caches have a clean line in S, with 1 cache having the line in F. If the cache with the line in F needs to evict, it will alert the sharing caches. The cache that is the most recent to enter the shared domain transitions its state to F, such as at 1552, and the evicted F cache changes its state to I, such as at 1594. In the situation where only one cache in S remains, that cache will instead transition to E to maintain consistency with the protocol and signify that no sharers remain.

An eviction of a line in O follows the same concept. When the cache in O is evicted, for example at 1592, one of the caches in S will transition to O, such as at 1562. If only 1 S cache exits, that cache will instead transition to M, such as at 1566, maintaining within the protocol that only a cache in M will write-back to memory if it is evicted, such as at 1578.

It can be observed that in this protocol, the O state serves as the F state for dirty data. All responses to read requests for shared data (GetS), will be handled by the O state (dirty) or the F state (clean). Since two sharing lines cannot exist in O and F together, if a cache in one of these states receives a GetS, it will instantly respond with the data. Additionally, transitions away from the O and F state are identical, as can be seen in FIG. 15. Because of this, and the identical process of passing the state to an S cache on an eviction, the complexity and implementation overhead of having both the F and O states is very small.

Properly following this protocol results in at least the following improvements to cache coherency protocols:
1. It is guaranteed only one cache responds to any given request. Improving the feasibility of using this protocol for any implementation (snoop bus, directory, etc.).
2. A minimum number (2) of memory access cases exist: (1) A read-miss when the cache line does not currently exist in the coherency domain, and (2) a write-back on eviction of a cache-line in M. This results in a performance improvement over existing protocols.

Determining Who Will Transition States.

Implementing F or O state passing requires knowing which S cache is the one to transition states. Changes in S order must be monitored as caches enter (such as at 1556) and exit (such as at 1552 to F, 1558 to I, 1560 to E, 1562 to O, and 1564 or 1566 to M) the shared coherency domain. Additionally, the total number of S caches needs to be known, to determine if the transition needs to be made to O(dirty)/F(clean), or M(dirty)/E(clean) in the case that no other sharers remain.

Shadow Tag Coherence Management Unit Micro-Architecture

Figure 18:
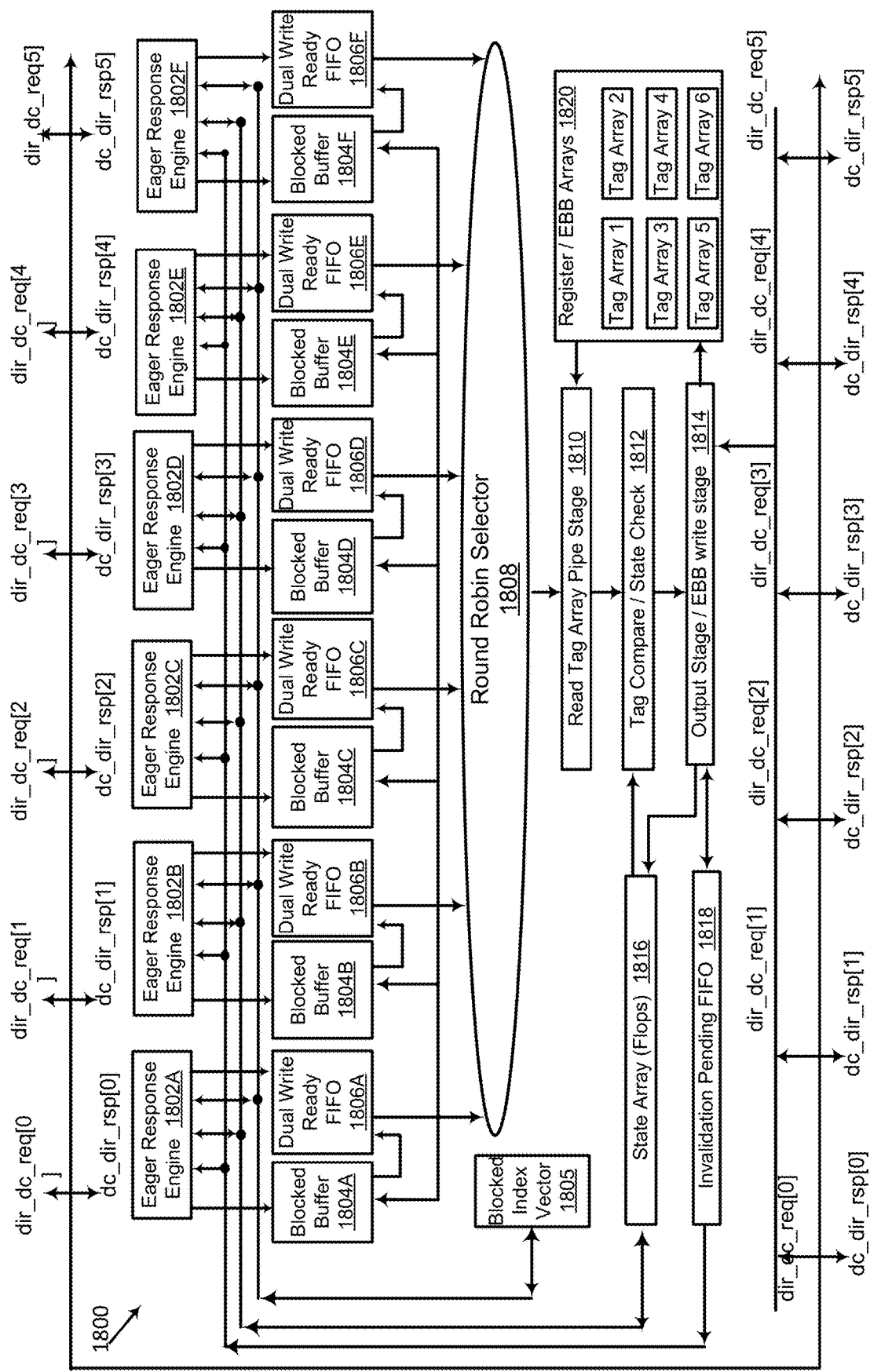
FIG. 18 is a block diagram illustrating a Shadow Tag Coherency Management Unit Micro, according to some embodiments.
Figure 19:
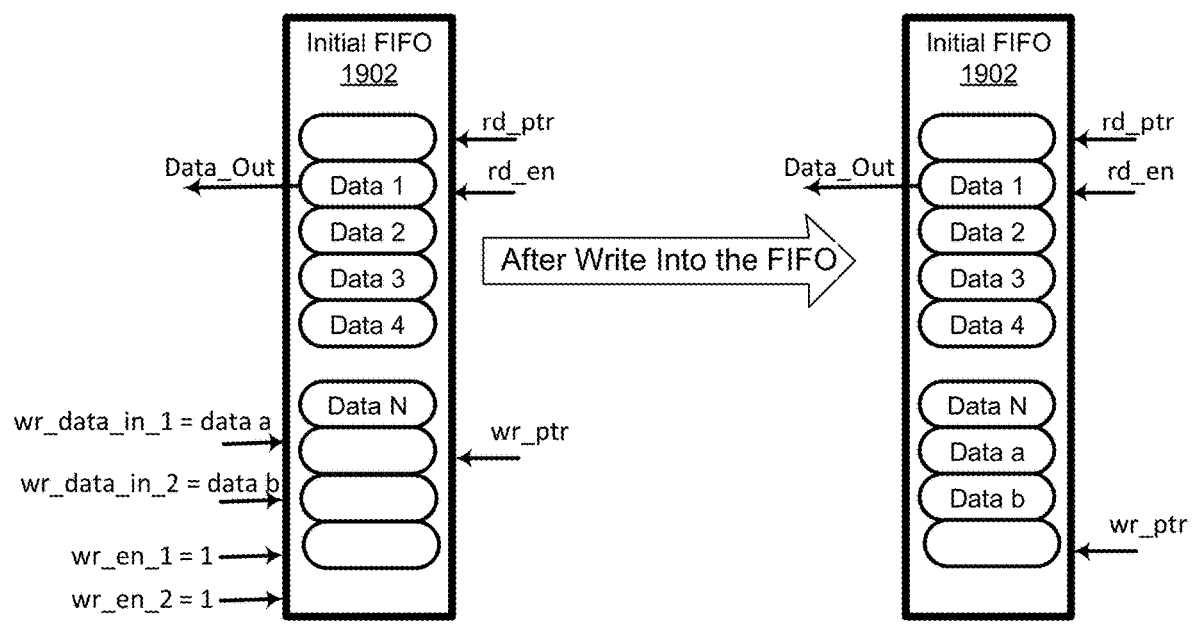
FIG. 19 is a block diagram illustrating a Dual Write into the Ready FIFO, according to some embodiments.

FIG. 18 is a block diagram illustrating a Shadow Tag Coherency Management Unit Micro, according to some embodiments. As shown, the overall system 1800 is a six-stage pipelined architecture through which transactions cycle through and can provide a response every cycle. In order to conservatively ensure correctness, it uses a 64-bit blocked index vector of flops to ensure that only one cache coherency request at a time is processed for any particular index.

System 1800 includes six eager response engines which can provide up to six responses every cycle (one response to each cache), exploiting scenarios where other pipes caches' do not have the index occupied. This helps in speeding up UpgradeE2M, evict instructions and initial cache bring up and potentially when the lines read by caches might fall into different index ranges.

Requests are first checked in the corresponding pipe's eager response engine to determine whether an immediate response is possible. If Eager Response is possible, it is responded in the next cycle and then cleared. If Eager Response is not possible, it is checked with the blocked index. If the request's index is not blocked, it is added to the Ready FIFO. If it is blocked, it is added to the corresponding blocked buffer. The entries in the blocked buffer monitor the response port from the cache to detect completion of requests and unblock requests which get added onto the Ready FIFO through the second read port.

There is a round robin selector which looks at each of the six FIFOs and selects one transaction. The three main processing stages of the pipe are:
 i) Initiate tag read;
 ii) Tag compare/State check; and
 iii) Initiate Outputs and FIFO writes.

In the case of a WR transaction waiting on invalidation responses, then it is moved into the Invalidation Pending FIFO and an invalidation request is sent. This is kept separate from the other stages so that requests can keeping moving along the pipe while waiting for invalidation responses from the caches. There is a 3-bit counter for each entry in the Invalidation Pending FIFO, which counts the invalidation responses and decides when to send the final response.

When the invalidation from all caches is completed (signified by the counter), the Invalidation Pending FIFO seizes the output bus for sending the final response. The Invalidation Pending may stall the transaction pipeline only if the transaction pipeline requests to talk to the same cache on the same cycle.

Eager Response Engine Micro-Architecture

The Eager Response Engine's functionality is to respond in parallel to all caches if tag array reads are not involved and physical ports are not occupied. Among the various instructions from the cache to the shadow tag, UpgradeE2M always do not require a tag array read and hence can be accelerated.

For the RD and WR operations it checks for the following four conditions:
 i) Is the state for this index invalid for all the ways of the other caches?
 ii) Is the output port for the requesting pipe available to respond in next cycle?
 iii) Is the tag array write port of this pipe's tag array available next cycle?
 iv) Is this index NOT a part of the blocked indexes?

For an UpgradeE2M, the Eager Response Engine checks to make sure the index is not a part of the blocked indexes and if so, performs the update of state array in the next cycle.

For an evict request, the following conditions are checked:
  i) Is the tag array write port of this pipe's tag array available next cycle?
  ii) Is this index NOT a part of the blocked indexes?
  iii) Is the output port for the certain necessary pipes (depending on whether a FloatF or FloatO is sent to other caches) available to respond in next cycle?

For all these three cases, if the conditions are satisfied, eager response is initiated, and the response is sent by the eager response engine in the immediate next cycle without involving the coherency transaction pipeline.

If any of the conditions are NOT satisfied, then Eager Response is NOT initiated, and data is moved to the Dual write Ready FIFOs.

The EBB write as well as the Eager Response are generated the next cycle. The blocked index and the state array is updated in the Eager Response check cycle itself to ensure that requests coming in the next cycle are assessed correctly with the updated state information.

In addition to these functions, the Eager Response Engine gets the response from the invalidation FIFO and muxes between the Eager response and the response from the Invalidation FIFO.

Dual Write Ready FIFO

The Ready FIFO is a 2WR 1RD FIFO. It can potentially write two requests or less every cycle into the FIFO. FIFO depths are a multiple of two to ensure that wrap around conditions are mux-free and simple. One of the write ports services incoming and transactions and the other services transactions that can come from blocked requests getting unblocked and get added to the Ready FIFO. The other port is the second write port.

Round Robin Selector

The round robin selector chooses one of six transactions. Among the six valid transactions, a 6-1 priority decoder chooses the transaction with the highest priority. There are a series of priority select flops which change priority for the next transaction whenever the current transaction is selected, giving lowest priority to the FIFO from which the transaction was selected and shifting the priorities accordingly in a round robin fashion.

The read from the FIFO is initiated only at the end of the cycle and the peeked data and veliids are flopped and passed to the Read Tag array stage even before the read is initiated.

Read Tag Array Pipe Stage

The read tag array stage mainly initiates read requests to the tag EBBs. The valid array read out and indexes from the previous stage are flopped and passed to the read EBB stage.

A read is only initiated when the EBB is necessary to be read as signified by the valid array. In case of an Invalidate where the requestor is in S, M, E states where the EBBs need not be read, then EBB read is NOT done. In the case of an UpgradeE2M, this stage does not perform any operation.

This stage also prepares the reads the state arrays to look at the state for that particular index and flops them in a state bit vector which can be easily accessed in the next stage.

Tag Compare/State Check Pipe Stage

The read-out Tags are compared with the input tag and the ones that match are noted and used in the next stage of processing.

For RD transactions, if there is an F or O that is marked as forwarder and the combinational output for it is, the combinational outputs for the requesting core's cache as well as other necessary caches are kept ready in this stage as well.
  i) For WR transactions, invalidation requests are formed combinatorically.
  ii) For UpgradeE2M transactions, the index to be upgraded is noted to be sent to the state array in the next cycle.
  iii) For the evict transactions, the successor F or O is decided, and Float responses are combinational prepared.

Output/Tag Write Stage

The output is flopped and sent to the Eager Response engine which muxes both and sends the final output. This stage can receive a stall from the Invalidation FIFO in which case the stall is propagated to the other stages and up to the selector.

The tag EBB updates as well as the valid updates are performed in this cycle.

If the coherency transaction needs to be sent to the Invalidation Pending FIFO, it is decided in this stage and sent. The invalidation Write ptr is used to send as request ID for Invalidation requests that it Invalidation Pending FIFO This is a 4-deep flop-based FIFO with a counter for each entry. The Invalidation FIFO counter looks at the response bits dc_dir_rsp[5:0] and based on the invalidate responses updates the counter.

When the counter reaches the necessary value (which is stored in the FIFO), then the invalidation is deemed as complete and this stage seizes the output bus and writes the WR final response.

Eager Pre-Response Fetch

This feature is implemented in the D-cache design. The cache looks at a software set MSR bit pre-response fetch enable and initiates a request to memory at the same time as it launches a request to the coherency controller. This hides the cycle penalty due to the coherency management unit on a cache miss. This can be a significant penalty with multiple threads performing several concurrent loads/stores and more so when die-level coherency is enabled.

The outstanding queue of the cache has two extra bits/entry to note cache-to-cache transfers and whether Pre-Response has been initiated. When the prefetch is initiated the Pre_response_inititated bit is set and when the response is obtained from the coherency, based on the response the cache_to_cache bit is set. The cache looks at these 2 bits and decides whether to discard the fetched data or to use it.

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 20A:
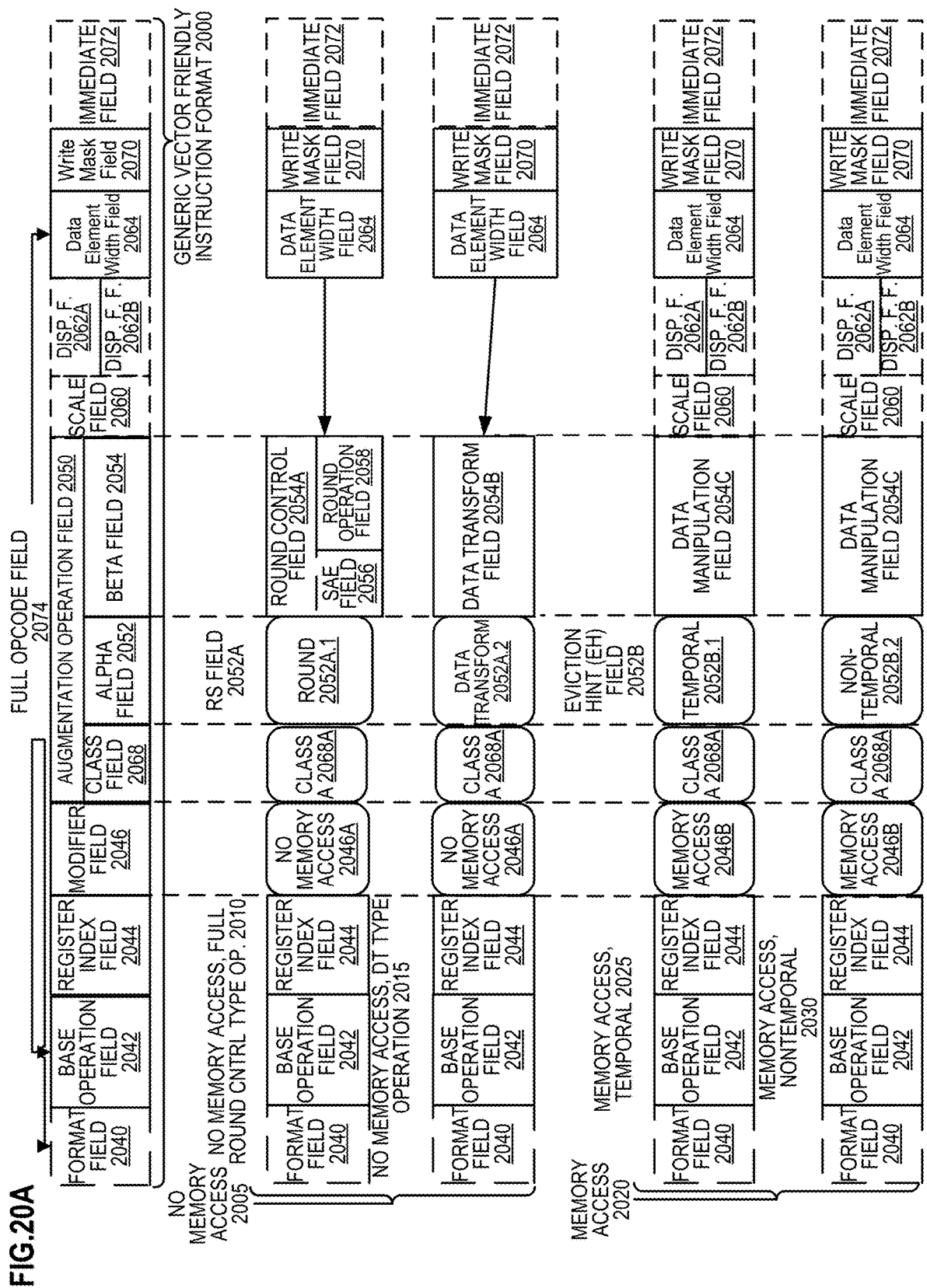

FIGS. 20A-20B are block diagrams illustrating a generic vector friendly instruction format and instruction templates thereof according to some embodiments. FIG. 20A is a block diagram illustrating a generic vector friendly instruction format and class A instruction templates thereof according to some embodiments; while FIG. 20B is a block diagram illustrating the generic vector friendly instruction format and class B instruction templates thereof according to some embodiments. Specifically, a generic vector friendly instruction format 2000 for which are defined class A and class B instruction templates, both of which include no memory access 2005 instruction templates and memory access 2020 instruction templates. The term generic in the context of the vector friendly instruction format refers to the instruction format not being tied to any specific instruction set.

While embodiments will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 20A include: 1) within the no memory access 2005 instruction templates there is shown a no memory access, full round control type operation 2010 instruction template and a no memory access, data transform type operation 2015 instruction template; and 2) within the memory access 2020 instruction templates there is shown a memory access, temporal 2025 instruction template and a memory access, non-temporal 2030 instruction template. The class B instruction templates in FIG. 20B include: 1) within the no memory access 2005 instruction templates there is shown a no memory access, write mask control, partial round control type operation 2012 instruction template and a no memory access, write mask control, vsize type operation 2017 instruction template; and 2) within the memory access 2020 instruction templates there is shown a memory access, write mask control 2027 instruction template.

The generic vector friendly instruction format 2000 includes the following fields listed below in the order illustrated in FIGS. 20A-20B.

Format field 2040—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 2042—its content distinguishes different base operations.

Register index field 2044—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 2046—its content distinguishes occurrences of instructions in the generic vector instruction format that specify memory access from those that do not; that is, between no memory access 2005 instruction templates and memory access 2020 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 2050—its content distinguishes which one of a variety of different operations to be performed in addition to the base operation. This field is context specific. In some embodiments, this field is divided into a class field 2068, an alpha field 2052, and a beta field 2054. The augmentation operation field 2050 allows common groups of operations to be performed in a single instruction rather than 2, 3, or 4 instructions.

Scale field 2060—its content allows for the scaling of the index field's content for memory address generation (e.g., for address generation that uses $2^{scale}$*index+base).

Displacement Field 2062A—its content is used as part of memory address generation (e.g., for address generation that uses $2^{scale}$*index+base+displacement).

Displacement Factor Field 2062B (note that the juxtaposition of displacement field 2062A directly over displacement factor field 2062B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 2074 (described later herein) and the data manipulation field 2054C. The displacement field 2062A and the displacement factor field 2062B are optional in the sense that they are not used for the no memory access 2005 instruction templates and/or different embodiments may implement only one or none of the two.

Data element width field 2064—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 2070—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 2070 allows for partial vector operations, including loads, stores, arithmetic, logical, etc. While embodiments are described in which the write mask field's 2070 content selects one of a number of write mask registers that contains the write mask to be used (and thus the write mask field's 2070 content indirectly identifies that masking to be performed), alternative embodiments instead or additional allow the mask write field's 2070 content to directly specify the masking to be performed.

Immediate field 2072—its content allows for the specification of an immediate. This field is optional in the sense that is it not present in an implementation of the generic vector friendly format that does not support immediate and it is not present in instructions that do not use an immediate.

Class field 2068—its content distinguishes between different classes of instructions. With reference to FIGS. 20A-B, the contents of this field select between class A and class B instructions. In FIGS. 20A-B, rounded corner squares are used to indicate a specific value is present in a field (e.g., class A 2068A and class B 2068B for the class field 2068 respectively in FIGS. 20A-B).

Instruction Templates of Class A

In the case of the non-memory access 2005 instruction templates of class A, the alpha field 2052 is interpreted as an RS field 2052A, whose content distinguishes which one of the different augmentation operation types are to be performed (e.g., round 2052A.1 and data transform 2052A.2 are respectively specified for the no memory access, round type operation 2010 and the no memory access, data transform type operation 2015 instruction templates), while the beta field 2054 distinguishes which of the operations of the specified type is to be performed. In the no memory access 2005 instruction templates, the scale field 2060, the displacement field 2062A, and the displacement scale filed 2062B are not present.

No-Memory Access Instruction Templates—Full Round Control Type Operation

In the no memory access full round control type operation 2010 instruction template, the beta field 2054 is interpreted as a round control field 2054A, whose content(s) provide static rounding. While in the described embodiments the round control field 2054A includes a suppress all floating-point exceptions (SAE) field 2056 and a round operation control field 2058, alternative embodiments may support may encode both these concepts into the same field or only have one or the other of these concepts/fields (e.g., may have only the round operation control field 2058).

SAE field 2056—its content distinguishes whether or not to disable the exception event reporting; when the SAE field's 2056 content indicates suppression is enabled, a given instruction does not report any kind of floating-point exception flag and does not raise any floating-point exception handler.

Round operation control field 2058—its content distinguishes which one of a group of rounding operations to perform (e.g., Round-up, Round-down, Round-towards-zero and Round-to-nearest). Thus, the round operation control field 2058 allows for the changing of the rounding mode on a per instruction basis. In some embodiments where a processor includes a control register for specifying rounding modes, the round operation control field's 2050 content overrides that register value.

No Memory Access Instruction Templates—Data Transform Type Operation

In the no memory access data transform type operation 2015 instruction template, the beta field 2054 is interpreted as a data transform field 2054B, whose content distinguishes which one of a number of data transforms is to be performed (e.g., no data transform, swizzle, broadcast).

In the case of a memory access 2020 instruction template of class A, the alpha field 2052 is interpreted as an eviction hint field 2052B, whose content distinguishes which one of the eviction hints is to be used (in FIG. 20A, temporal 2052B.1 and non-temporal 2052B.2 are respectively specified for the memory access, temporal 2025 instruction template and the memory access, non-temporal 2030 instruction template), while the beta field 2054 is interpreted as a data manipulation field 2054C, whose content distinguishes which one of a number of data manipulation operations (also known as primitives) is to be performed (e.g., no manipulation; broadcast; up conversion of a source; and down conversion of a destination). The memory access 2020 instruction templates include the scale field 2060, and optionally the displacement field 2062A or the displacement scale field 2062B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 2052 is interpreted as a write mask control (Z) field 2052C, whose content distinguishes whether the write masking controlled by the write mask field 2070 should be a merging or a zeroing.

In the case of the non-memory access 2005 instruction templates of class B, part of the beta field 2054 is interpreted as an RL field 2057A, whose content distinguishes which one of the different augmentation operation types are to be performed (e.g., round 2057A.1 and vector length (VSIZE) 2057A.2 are respectively specified for the no memory access, write mask control, partial round control type operation 2012 instruction template and the no memory access, write mask control, VSIZE type operation 2017 instruction template), while the rest of the beta field 2054 distinguishes which of the operations of the specified type is to be performed. In the no memory access 2005 instruction templates, the scale field 2060, the displacement field 2062A, and the displacement scale filed 2062B are not present.

In the no memory access, write mask control, partial round control type operation 2010 instruction template, the rest of the beta field 2054 is interpreted as a round operation field 2059A and exception event reporting is disabled (a given instruction does not report any kind of floating-point exception flag and does not raise any floating-point exception handler).

Round operation control field 2059A—just as round operation control field 2058, its content distinguishes which one of a group of rounding operations to perform (e.g., Round-up, Round-down, Round-towards-zero and Round-to-nearest). Thus, the round operation control field 2059A allows for the changing of the rounding mode on a per instruction basis. In some embodiments where a processor includes a control register for specifying rounding modes, the round operation control field's 2050 content overrides that register value.

In the no memory access, write mask control, VSIZE type operation 2017 instruction template, the rest of the beta field 2054 is interpreted as a vector length field 2059B, whose content distinguishes which one of a number of data vector lengths is to be performed on (e.g., 128, 256, or 512 byte).

In the case of a memory access 2020 instruction template of class B, part of the beta field 2054 is interpreted as a broadcast field 2057B, whose content distinguishes whether or not the broadcast type data manipulation operation is to be performed, while the rest of the beta field 2054 is interpreted the vector length field 2059B. The memory access 2020 instruction templates include the scale field 2060, and optionally the displacement field 2062A or the displacement scale field 2062B.

With regard to the generic vector friendly instruction format 2000, a full opcode field 2074 is shown including the format field 2040, the base operation field 2042, and the data element width field 2064. While one embodiment is shown where the full opcode field 2074 includes all of these fields, the full opcode field 2074 includes less than all of these fields in embodiments that do not support all of them. The full opcode field 2074 provides the operation code (opcode).

The augmentation operation field 2050, the data element width field 2064, and the write mask field 2070 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general-purpose cores, one of the graphics cores intended primarily for graphics and/or scientific computing may support only class A, while one or more of the general-purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 21A is a block diagram illustrating an exemplary specific vector friendly instruction format according to some embodiments. FIG. 21A shows a specific vector friendly instruction format 2100 that is specific in the sense that it specifies the location, size, interpretation, and order of the fields, as well as values for some of those fields. The specific vector friendly instruction format 2100 may be used to extend the x86 instruction set, and thus some of the fields are similar or the same as those used in the existing x86 instruction set and extension thereof (e.g., AVX). This format remains consistent with the prefix encoding field, real opcode byte field, MOD RIM field, SIB field, displacement field, and immediate fields of the existing x86 instruction set with extensions. The fields from FIG. 20 into which the fields from FIG. 21A map are illustrated.

It should be understood that, although embodiments are described with reference to the specific vector friendly instruction format 2100 in the context of the generic vector friendly instruction format 2000 for illustrative purposes, the invention is not limited to the specific vector friendly instruction format 2100 except where claimed. For example, the generic vector friendly instruction format 2000 contemplates a variety of possible sizes for the various fields, while the specific vector friendly instruction format 2100 is shown as having fields of specific sizes. By way of specific example, while the data element width field 2064 is illustrated as a one-bit field in the specific vector friendly instruction format 2100, the invention is not so limited (that is, the generic vector friendly instruction format 2000 contemplates other sizes of the data element width field 2064).

The generic vector friendly instruction format 2000 includes the following fields listed below in the order illustrated in FIG. 21A.

EVEX Prefix (Bytes 0-3) 2102—is encoded in a four-byte form.

Format Field 2040 (EVEX Byte 0, bits [7:0])—the first byte (EVEX Byte 0) is the format field 2040 and it contains 0x62 (the unique value used for distinguishing the vector friendly instruction format in some embodiments).

The second-fourth bytes (EVEX Bytes 1-3) include a number of bit fields providing specific capability.

REX field 2105 (EVEX Byte 1, bits [7-5])—consists of a EVEX.R bit field (EVEX Byte 1, bit [7]-R), EVEX.X bit field (EVEX byte 1, bit [6]-X), and 2057BEX byte 1, bit[5]-B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' 2110A—this is the first part of the REX' field 2110 and is the EVEX.R' bit field (EVEX Byte 1, bit [4]-R') that is used to encode either the upper 16 or lower 16 of the extended 32 register set. In some embodiments, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 2115 (EVEX byte 1, bits [3:0]-mmmm)—its content encodes an implied leading opcode byte (0F, 0F 38, or 0F 3).

Data element width field 2064 (EVEX byte 2, bit [7]-W)—is represented by the notation EVEX.W. EVEX.W is used to define the granularity (size) of the datatype (either 32-bit data elements or 64-bit data elements).

EVEX.vvvv 2120 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 2120 encodes the 4 low-order bits of the first source register specifier stored in inverted (1s complement) form. Depending on the instruction, an extra different EVEX bit field is used to extend the specifier size to 32 registers.

EVEX.0 2068 Class field (EVEX byte 2, bit [2]-U)—If EVEX.0=0, it indicates class A or EVEX.U0; if EVEX.0=1, it indicates class B or EVEX.U1.

Prefix encoding field 2125 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2-bit SIMD prefix encodings, and thus not require the expansion.

Alpha field 2052 (EVEX byte 3, bit [7]-EH; also known as EVEX.EH, EVEX.rs, EVEX.RL, EVEX.write mask control, and EVEX.N; also illustrated with α)—as previously described, this field is context specific.

Beta field 2054 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' 2110B—this is the remainder of the REX' field 2110 and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 2070 (EVEX byte 3, bits [2:0]-kkk)—its content specifies the index of a register in the write mask registers as previously described. In some embodiments, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 2130 (Byte 4) is also known as the opcode byte. Part of the opcode is specified in this field.

MOD R/M Field 2140 (Byte 5) includes MOD field 2142, Reg field 2144, and R/M field 2146. As previously described, the MOD field's 2142 content distinguishes between memory access and non-memory access operations. The role of Reg field 2144 can be summarized to two situations: encoding either the destination register operand or a source register operand or be treated as an opcode extension and not used to encode any instruction operand. The role of R/M field 2146 may include the following: encoding the instruction operand that references a memory address or encoding either the destination register operand or a source register operand.

Scale, Index, Base (SIB) Byte (Byte 6)—As previously described, the scale field's 2050 content is used for memory address generation. SIB.xxx 2154 and SIB.bbb 2156—the contents of these fields have been previously referred to with regard to the register indexes Xxxx and Bbbb.

Displacement field 2062A (Bytes 7-10)—when MOD field 2142 contains 10, bytes 7-10 are the displacement field 2062A, and it works the same as the legacy 32-bit displacement (disp32) and works at byte granularity.

Displacement factor field 2062B (Byte 7)—when MOD field 2142 contains 01, byte 7 is the displacement factor field 2062B. The location of this field is that same as that of the legacy x86 instruction set 8-bit displacement (disp8), which works at byte granularity. Since disp8 is sign extended, it can only address between −128 and 127 bytes offsets; in terms of 64-byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 2062B is a reinterpretation of disp8; when using displacement factor field 2062B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement assumes that the effective displacement is multiple of the granularity of the memory access, and hence, the redundant low-order bits of the address offset do not need to be encoded. In other words, the displacement factor field 2062B substitutes the legacy x86 instruction set 8-bit displacement. Thus, the displacement factor field 2062B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 2072 operates as previously described.

Full Opcode Field

FIG. 21B is a block diagram illustrating the fields of the specific vector friendly instruction format 2100 that make up the full opcode field 2074 according to some embodiments. Specifically, the full opcode field 2074 includes the format field 2040, the base operation field 2042, and the data element width (W) field 2064. The base operation field 2042 includes the prefix encoding field 2125, the opcode map field 2115, and the real opcode field 2130.

Register Index Field

FIG. 21C is a block diagram illustrating the fields of the specific vector friendly instruction format 2100 that make up the register index field 2044 according to some embodiments. Specifically, the register index field 2044 includes the REX field 2105, the REX' field 2110, the MODR/M.reg field 2144, the MODR/M.r/m field 2146, the VVVV field 2120, xxx field 2154, and the bbb field 2156.

Augmentation Operation Field

Figure 21D:
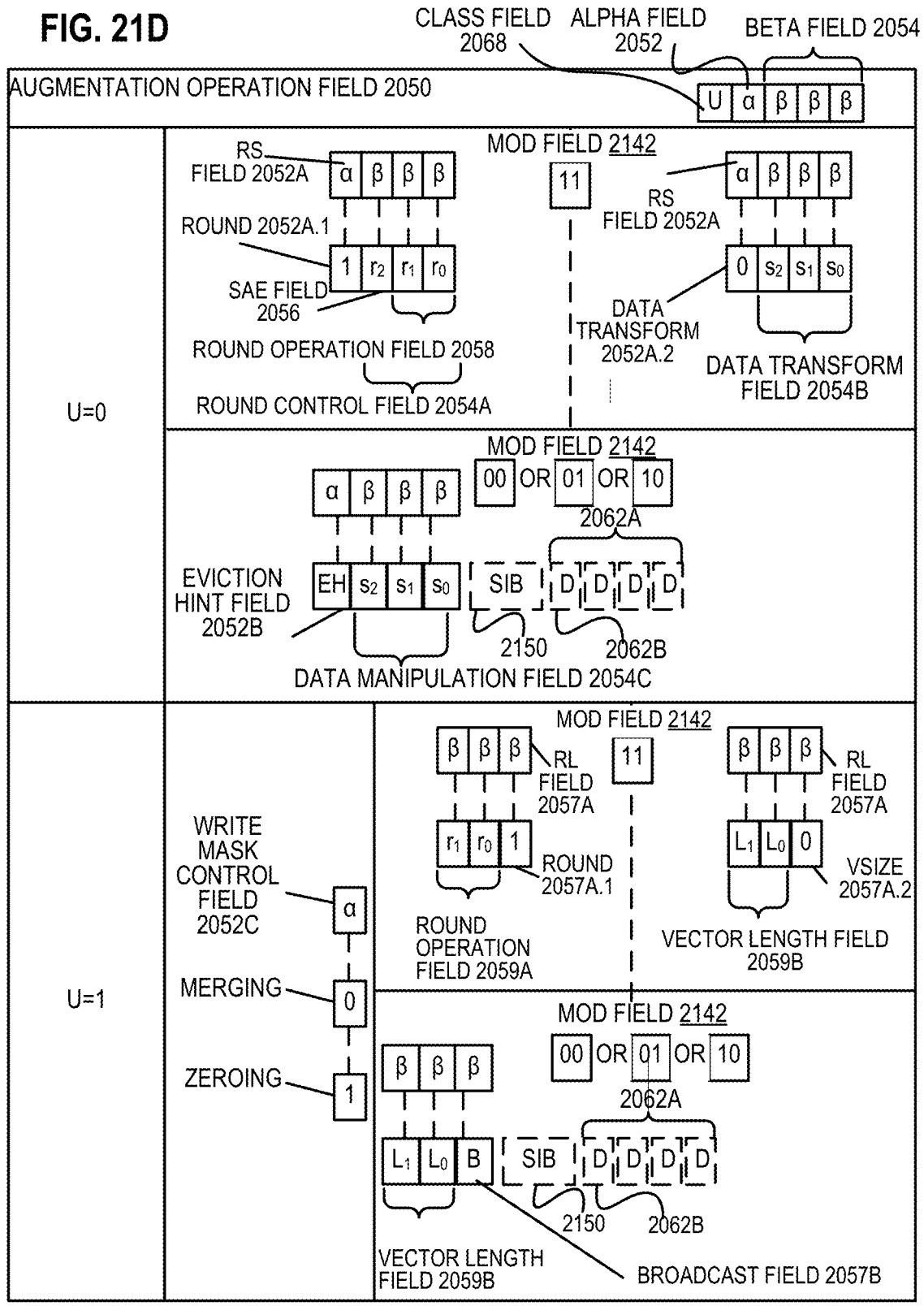
FIG. 21D is a block diagram illustrating the fields of the specific vector friendly instruction format that make up the augmentation operation field according to one embodiment.

FIG. 21D is a block diagram illustrating the fields of the specific vector friendly instruction format 2100 that make up the augmentation operation field 2050 according to some embodiments. When the class (U) field 2068 contains 0, it signifies EVEX.U0 (class A 2068A); when it contains 1, it signifies EVEX.U1 (class B 2068B). When U=0 and the MOD field 2142 contains 11 (signifying a no memory access operation), the alpha field 2052 (EVEX byte 3, bit [7]-EH) is interpreted as the rs field 2052A. When the rs field 2052A contains a 1 (round 2052A.1), the beta field 2054 (EVEX byte 3, bits [6:4]-SSS) is interpreted as the round control field 2054A. The round control field 2054A includes a one-bit SAE field 2056 and a two-bit round operation field 2058. When the rs field 2052A contains a 0 (data transform 2052A.2), the beta field 2054 (EVEX byte 3, bits [6:4]-SSS) is interpreted as a three-bit data transform field 2054B. When U=0 and the MOD field 2142 contains 00, 01, or 10 (signifying a memory access operation), the alpha field 2052 (EVEX byte 3, bit [7]-EH) is interpreted as the eviction hint (EH) field 2052B and the beta field 2054 (EVEX byte 3, bits [6:4]-SSS) is interpreted as a three bit data manipulation field 2054C.

When U=1, the alpha field 2052 (EVEX byte 3, bit [7]-EH) is interpreted as the write mask control (Z) field 2052C. When U=1 and the MOD field 2142 contains 11 (signifying a no memory access operation), part of the beta field 2054 (EVEX byte 3, bit [4]-$S_0$) is interpreted as the RL field 2057A; when it contains a 1 (round 2057A.1) the rest of the beta field 2054 (EVEX byte 3, bit [6-5]-$S_{2-1}$) is interpreted as the round operation field 2059A, while when the RL field 2057A contains a 0 (VSIZE 2057.A2) the rest of the beta field 2054 (EVEX byte 3, bit [6-5]-$S_{2-1}$) is interpreted as the vector length field 2059B (EVEX byte 3, bit [6-5]-$L_{1-0}$). When U=1 and the MOD field 2142 contains 00, 01, or 10 (signifying a memory access operation), the beta field 2054 (EVEX byte 3, bits [6:4]-SSS) is interpreted as the vector length field 2059B (EVEX byte 3, bit [6-5]-$L_{1-0}$) and the broadcast field 2057B (EVEX byte 3, bit [4]-B).

Exemplary Register Architecture

Figure 22:
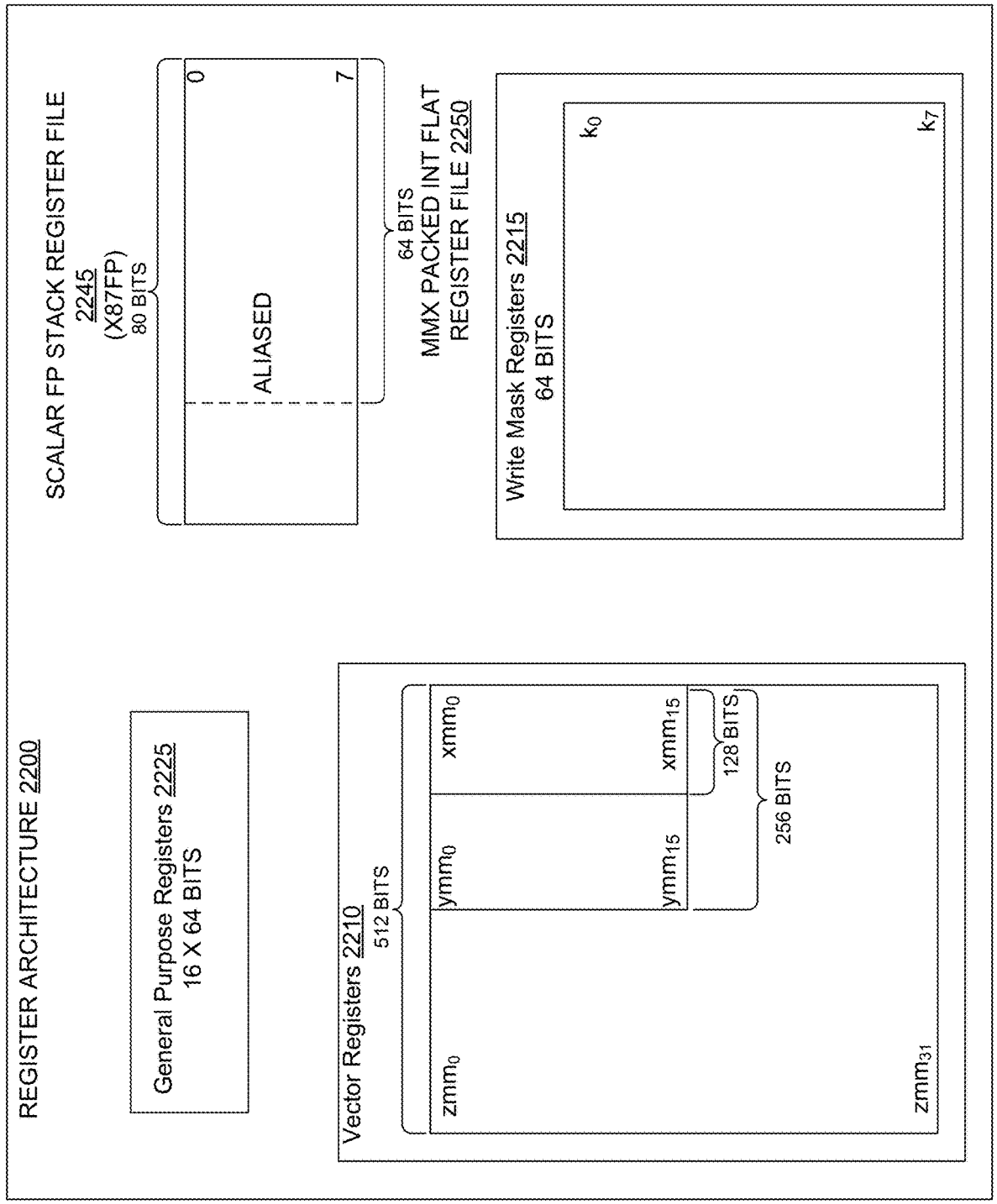
FIG. 22 is a block diagram of a register architecture according to one embodiment.

FIG. 22 is a block diagram of a register architecture 2200 according to some embodiments. In the embodiment illustrated, there are 32 vector registers 2210 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 2100 operates on these overlaid register file as illustrated in the below tables.

| Adjustable Vector Length | Class | Operations | Registers |
|---|---|---|---|
| Instruction Templates that do not include the vector length field 2059B | A (FIG. 20A; U = 0) | 2010, 2015, 2025, 2030 | zmm registers (the vector length is 64 byte) |
| | B (FIG. 20B; U = 1) | 2012 | zmm registers (the vector length is 64 byte) |
| Instruction templates that do include the vector length field 2059B | B (FIG. 20B; U = 1) | 2017, 2027 | zmm, ymm, or xmm registers (the vector length is 64-bytes, 32 bytes, or 16 bytes) depending on the vector length field 2059B |

In other words, the vector length field 2059B selects between a maximum length and one or more other shorter lengths, where each such shorter length is half the length of the preceding length; and instructions templates without the vector length field 2059B operate on the maximum vector length. Further, in one embodiment, the class B instruction templates of the specific vector friendly instruction format 2100 operate on packed or scalar single/double-precision floating-point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 2215—in the embodiment illustrated, there are 8 write mask registers (k0 through k7), each 64 bits in size. In an alternate embodiment, the write mask registers 2215 are 16 bits in size. As previously described, in some embodiments, the vector mask register k0 cannot be used as a write mask; when the encoding that would normally indicate k0 is used for a write mask, it selects a hardwired write mask of 0xffff, effectively disabling write masking for that instruction.

General-purpose registers 2225—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating-point stack register file (x87 stack) 2245, on which is aliased the MMX packed integer flat register file 2250—in the embodiment illustrated, the x87 stack is an eight-element stack used to perform scalar floating-point operations on 32/64/80-bit floating-point data using the x87 instruction set extension; while the MMX registers are used to perform operations on 64-bit packed integer data, as well as to hold operands for some operations performed between the MMX and XMM registers.

Alternative embodiments may use wider or narrower registers. Additionally, alternative embodiments may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 23A is a block diagram illustrating both an exemplary in-order pipeline and an exemplary register renaming, out-of-order issue/execution pipeline according to some embodiments. FIG. 23B is a block diagram illustrating both an exemplary embodiment of an in-order architecture core and an exemplary register renaming, out-of-order issue/execution architecture core to be included in a processor according to some embodiments. The solid lined boxes in FIGS. 23A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 23A, a processor pipeline 2300 includes a fetch stage 2302, a length decode stage 2304, a decode stage 2306, an allocation stage 2308, a renaming stage 2310, a scheduling (also known as a dispatch or issue) stage 2312, a register read/memory read stage 2314, an execute stage 2316, a write back/memory write stage 2318, an exception handling stage 2322, and a commit stage 2324.

FIG. 23B shows processor core 2390 including a front-end unit 2330 coupled to an execution engine unit 2350, and both are coupled to a memory unit 2370. The core 2390 may be a reduced instruction set computing (RISC) core, a complex instruction set computing (CISC) core, a very long instruction word (VLIW) core, or a hybrid or alternative core type. As yet another option, the core 2390 may be a special-purpose core, such as, for example, a network or communication core, compression engine, coprocessor core, general purpose computing graphics processing unit (GPGPU) core, graphics core, or the like.

The front-end unit 2330 includes a branch prediction unit 2332 coupled to an instruction cache unit 2334, which is coupled to an instruction translation lookaside buffer (TLB) 2336, which is coupled to an instruction fetch unit 2338, which is coupled to a decode unit 2340. The decode unit 2340 (or decoder) may decode instructions, and generate as an output one or more micro-operations, micro-code entry points, microinstructions, other instructions, or other control signals, which are decoded from, or which otherwise reflect, or are derived from, the original instructions. The decode unit 2340 may be implemented using various different mechanisms. Examples of suitable mechanisms include, but are not limited to, look-up tables, hardware implementations, programmable logic arrays (PLAs), microcode read only memories (ROMs), etc. In one embodiment, the core 2390 includes a microcode ROM or other medium that stores microcode for certain macroinstructions (e.g., in decode unit 2340 or otherwise within the front-end unit 2330). The decode unit 2340 is coupled to a rename/allocator unit 2352 in the execution engine unit 2350.

The execution engine unit 2350 includes the rename/allocator unit 2352 coupled to a retirement unit 2354 and a set of one or more scheduler unit(s) 2356. The scheduler unit(s) 2356 represents any number of different schedulers, including reservations stations, central instruction window, etc. The scheduler unit(s) 2356 is coupled to the physical register file(s) unit(s) 2358. Each of the physical register file(s) units 2358 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one embodiment, the physical register file(s) unit 2358 comprises a vector registers unit, a write mask registers unit, and a scalar registers unit. These register units may provide architectural vector registers, vector mask registers, and general-purpose registers. The physical register file(s) unit(s) 2358 is overlapped by the retirement unit 2354 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 2354 and the physical register file(s) unit(s) 2358 are coupled to the execution cluster(s) 2360. The execution cluster(s) 2360 includes a set of one or more execution units 2362 and a set of one or more memory access units 2364. The execution units 2362 may perform various operations (e.g., shifts, addition, subtraction, multiplication) and on various types of data (e.g., scalar floating-point, packed integer, packed floating-point, vector integer, vector floating-point). While some embodiments may include a number of execution units dedicated to specific functions or sets of functions, other embodiments may include only one execution unit or multiple execution units that all perform all functions. The scheduler unit(s) 2356, physical register file(s) unit(s) 2358, and execution cluster(s) 2360 are shown as being possibly plural because certain embodiments create separate pipelines for certain types of data/operations (e.g., a scalar integer pipeline, a scalar floating-point/packed integer/packed floating-point/vector integer/vector floating-point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 2364). It should also be understood that where separate pipelines are used, one or more of these pipelines may be out-of-order issue/execution and the rest in-order.

The set of memory access units 2364 is coupled to the memory unit 2370, which includes a data TLB unit 2372 coupled to a data cache unit 2374 coupled to a level 2 (L2) cache unit 2376. In one exemplary embodiment, the memory access units 2364 may include a load unit, a store address unit, and a store data unit, each of which is coupled to the data TLB unit 2372 in the memory unit 2370. The instruction cache unit 2334 is further coupled to a level 2 (L2) cache unit 2376 in the memory unit 2370. The L2 cache unit 2376 is coupled to one or more other levels of cache and eventually to a main memory.

By way of example, the exemplary register renaming, out-of-order issue/execution core architecture may implement the pipeline 2300 as follows: 1) the instruction fetch 2338 performs the fetch and length decoding stages 2302 and 2304; 2) the decode unit 2340 performs the decode stage 2306; 3) the rename/allocator unit 2352 performs the allocation stage 2308 and renaming stage 2310; 4) the scheduler unit(s) 2356 performs the schedule stage 2312; 5) the physical register file(s) unit(s) 2358 and the memory unit 2370 perform the register read/memory read stage 2314; the execution cluster 2360 perform the execute stage 2316; 6) the memory unit 2370 and the physical register file(s) unit(s) 2358 perform the write back/memory write stage 2318; 7) various units may be involved in the exception handling stage 2322; and 8) the retirement unit 2354 and the physical register file(s) unit(s) 2358 perform the commit stage 2324.

The core 2390 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 2390 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 2334/2374 and a shared L2 cache unit 2376, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 24B:
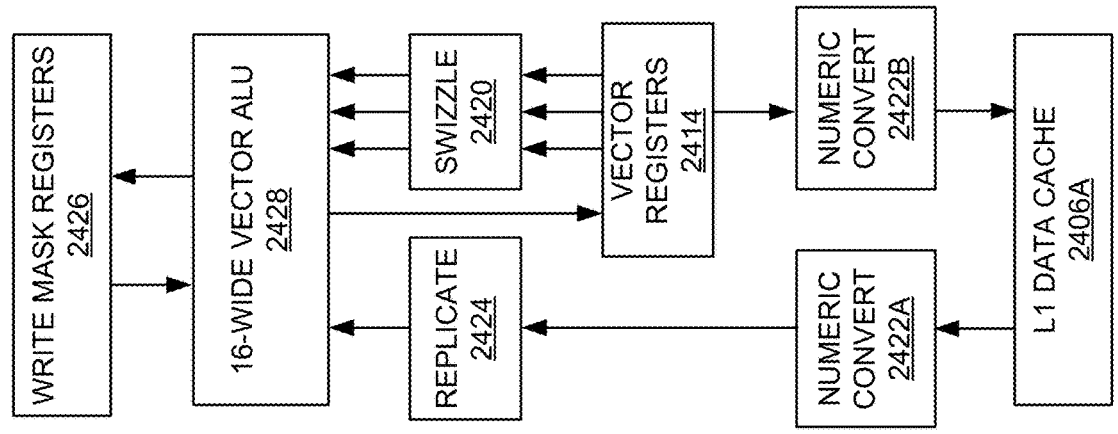
FIGS. 24A-B illustrate a block diagram of a more specific exemplary in-order core architecture, which core would be one of several logic blocks (including other cores of the same type and/or different types) in a chip.
Figure 24A:
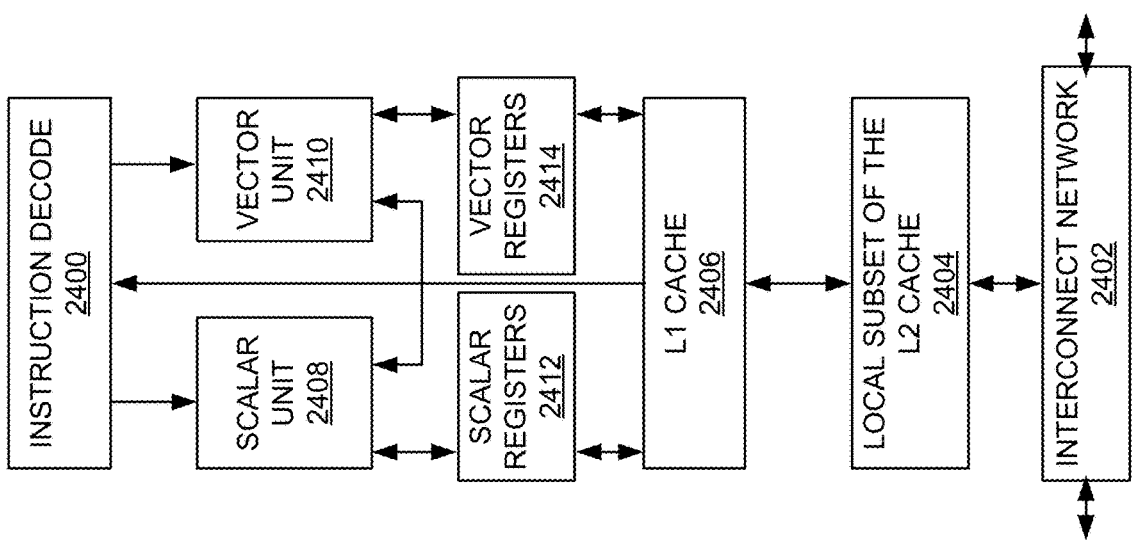

FIGS. 24A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 24A is a block diagram of a single processor core, along with its connection to the on-die interconnect network 2402 and with its local subset of the Level 2 (L2) cache 2404, according to some embodiments. In one embodiment, an instruction decoder 2400 supports the x86 instruction set with a packed data instruction set extension. An L1 cache 2406 allows low-latency accesses to cache memory into the scalar and vector units. While in one embodiment (to simplify the design), a scalar unit 2408 and a vector unit 2410 use separate register sets (respectively, scalar registers 2412 and vector registers 2414) and data transferred between them is written to memory and then read back in from a level 1 (L1) cache 2406, alternative embodiments may use a different approach (e.g., use a single register set or include a communication path that allow data to be transferred between the two register files without being written and read back).

The local subset of the L2 cache 2404 is part of a global L2 cache that is divided into separate local subsets, one per processor core. Each processor core has a direct access path to its own local subset of the L2 cache 2404. Data read by a processor core is stored in its L2 cache subset 2404 and can be accessed quickly, in parallel with other processor cores accessing their own local L2 cache subsets. Data written by a processor core is stored in its own L2 cache subset 2404 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 24B is an expanded view of part of the processor core in FIG. 24A according to some embodiments. FIG. 24B includes an L1 data cache 2406A part of the L1 cache 2404, as well as more detail regarding the vector unit 2410 and the vector registers 2414. Specifically, the vector unit 2410 is a 16-wide vector processing unit (VPU) (see the 16-wide ALU 2428), which executes one or more of integer, single-precision float, and double-precision float instructions. The VPU supports swizzling the register inputs with swizzle unit 2420, numeric conversion with numeric convert units 2422A-B, and replication with replication unit 2424 on the memory input. Write mask registers 2426 allow predicating resulting vector writes.

Figure 25:
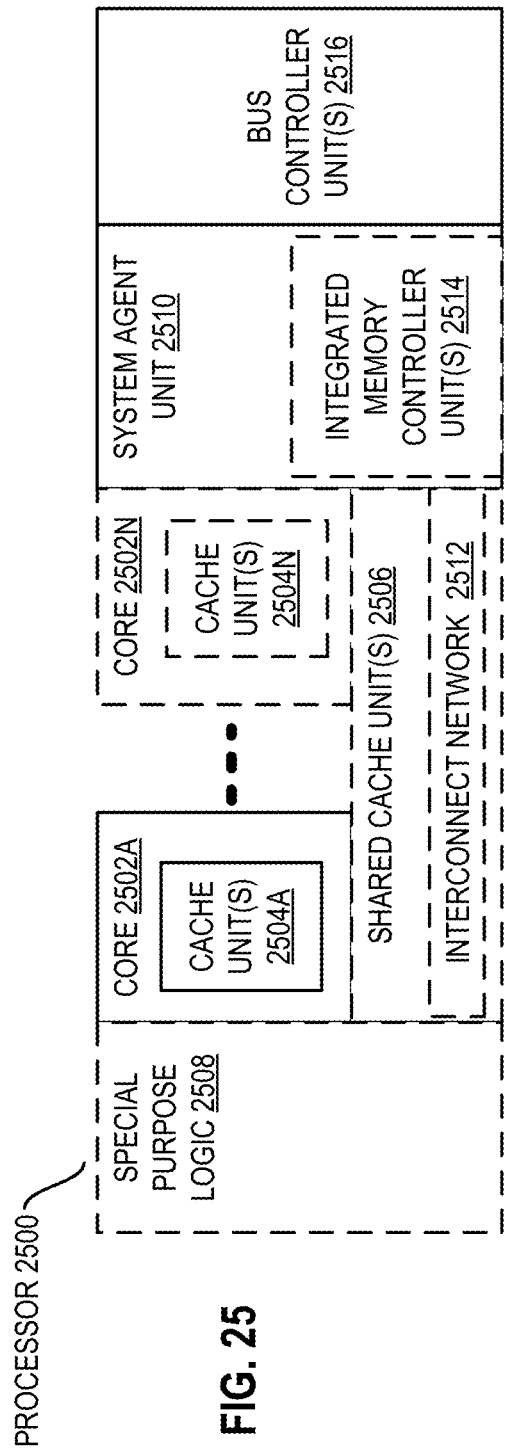
FIG. 25 is a block diagram of a processor that may have more than one core, may have an integrated memory controller, and may have integrated graphics according to some embodiments.

FIG. 25 is a block diagram of a processor 2500 that may have more than one core, may have an integrated memory controller, and may have integrated graphics according to some embodiments. The solid lined boxes in FIG. 25 illustrate a processor 2500 with a single core 2502A, a system agent 2510, a set of one or more bus controller units 2516, while the optional addition of the dashed lined boxes illustrates an alternative processor 2500 with multiple cores 2502A-N, a set of one or more integrated memory controller unit(s) 2514 in the system agent unit 2510, and special purpose logic 2508.

Thus, different implementations of the processor 2500 may include: 1) a CPU with the special purpose logic 2508 being integrated graphics and/or scientific (throughput) logic (which may include one or more cores), and the cores 2502A-N being one or more general purpose cores (e.g., general purpose in-order cores, general purpose out-of-order cores, a combination of the two); 2) a coprocessor with the cores 2502A-N being a large number of special purpose cores intended primarily for graphics and/or scientific (throughput); and 3) a coprocessor with the cores 2502A-N being a large number of general purpose in-order cores. Thus, the processor 2500 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 2500 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 2506, and external memory (not shown) coupled to the set of integrated memory controller units 2514. The set of shared cache units 2506 may include one or more mid-level caches, such as level 2 (L2), level 3 (L3), level 4 (L4), or other levels of cache, a last level cache (LLC), and/or combinations thereof. While in one embodiment a ring based interconnect unit 2512 interconnects the integrated graphics logic 2508 (integrated graphics logic 2508 is an example of and is also referred to herein as special purpose logic), the set of shared cache units 2506, and the system agent unit 2510/integrated memory controller unit(s) 2514, alternative embodiments may use any number of well-known techniques for interconnecting such units. In one embodiment, coherency is maintained between one or more cache units 2506 and cores 2502-A-N.

In some embodiments, one or more of the cores 2502A-N are capable of multi-threading. The system agent 2510 includes those components coordinating and operating cores 2502A-N. The system agent unit 2510 may include for example a power control unit (PCU) and a display unit. The PCU may be or include logic and components needed for regulating the power state of the cores 2502A-N and the integrated graphics logic 2508. The display unit is for driving one or more externally connected displays.

The cores 2502A-N may be homogenous or heterogeneous in terms of architecture instruction set; that is, two or more of the cores 2502A-N may be capable of execution the same instruction set, while others may be capable of executing only a subset of that instruction set or a different instruction set.

Exemplary Computer Architectures

FIGS. 26-29 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 26:
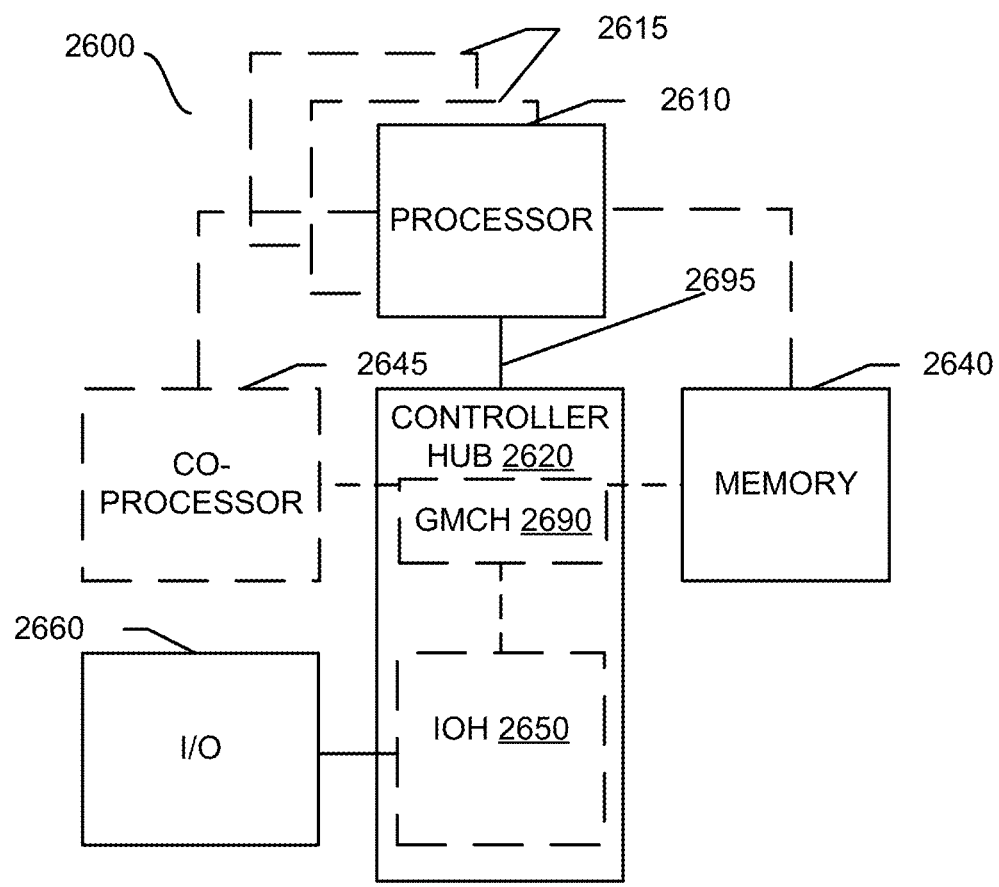
FIGS. 26-29 are block diagrams of exemplary computer architectures.

Referring now to FIG. 26, shown is a block diagram of a system 2600 in accordance with one embodiment of the present invention. The system 2600 may include one or more processors 2610, 2615, which are coupled to a controller hub 2620. In one embodiment the controller hub 2620 includes a graphics memory controller hub (GMCH) 2690 and an Input/Output Hub (IOH) 2650 (which may be on separate chips); the GMCH 2690 includes memory and graphics controllers to which are coupled memory 2640 and a coprocessor 2645; the IOH 2650 couples input/output (I/O) devices 2660 to the GMCH 2690. Alternatively, one or both of the memory and graphics controllers are integrated within the processor (as described herein), the memory 2640 and the coprocessor 2645 are coupled directly to the processor 2610, and the controller hub 2620 in a single chip with the IOH 2650.

The optional nature of additional processors 2615 is denoted in FIG. 26 with broken lines. Each processor 2610, 2615 may include one or more of the processing cores described herein and may be some version of the processor 2500.

The memory 2640 may be, for example, dynamic random-access memory (DRAM), phase change memory (PCM), or a combination of the two. For at least one embodiment, the controller hub 2620 communicates with the processor(s) 2610, 2615 via a multi-drop bus, such as a frontside bus (FSB), point-to-point interface such as QuickPath Interconnect (QPI), or similar connection 2695.

In one embodiment, the coprocessor 2645 is a special-purpose processor, such as, for example, a high-throughput MIC processor, a network or communication processor, compression engine, graphics processor, GPGPU, embedded processor, or the like. In one embodiment, controller hub 2620 may include an integrated graphics accelerator.

There can be a variety of differences between the physical resources 2610, 2615 in terms of a spectrum of metrics of merit including architectural, microarchitectural, thermal, power consumption characteristics, and the like.

In one embodiment, the processor 2610 executes instructions that control data processing operations of a general type. Embedded within the instructions may be coprocessor instructions. The processor 2610 recognizes these coprocessor instructions as being of a type that should be executed by the attached coprocessor 2645. Accordingly, the processor 2610 issues these coprocessor instructions (or control signals representing coprocessor instructions) on a coprocessor bus or other interconnect, to coprocessor 2645. Coprocessor(s) 2645 accept and execute the received coprocessor instructions.

Figure 27:
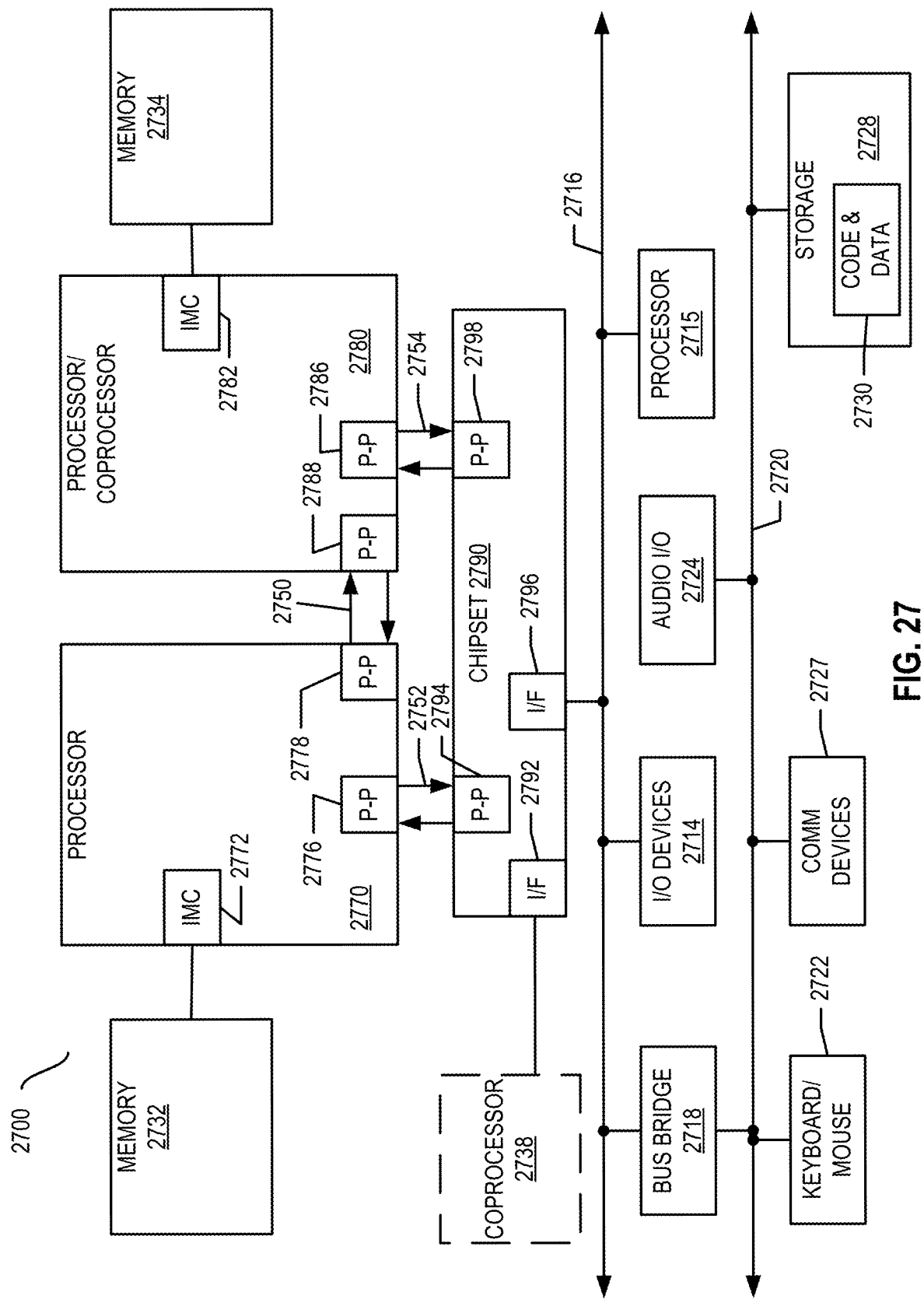

Referring now to FIG. 27, shown is a block diagram of a first more specific exemplary system 2700 in accordance with an embodiment of the present invention. As shown in FIG. 27, multiprocessor system 2700 is a point-to-point interconnect system, and includes a first processor 2770 and a second processor 2780 coupled via a point-to-point interconnect 2750. Each of processors 2770 and 2780 may be some version of the processor 2500. In some embodiments, processors 2770 and 2780 are respectively processors 2610 and 2615, while coprocessor 2738 is coprocessor 2645. In another embodiment, processors 2770 and 2780 are respectively processor 2610 coprocessor 2645.

Processors 2770 and 2780 are shown including integrated memory controller (IMC) units 2772 and 2782, respectively. Processor 2770 also includes as part of its bus controller units point-to-point (P-P) interfaces 2776 and 2778; similarly, second processor 2780 includes P-P interfaces 2786 and 2788. Processors 2770, 2780 may exchange information via a point-to-point (P-P) interface 2750 using P-P interface circuits 2778, 2788. As shown in FIG. 27, IMCs 2772 and 2782 couple the processors to respective memories, namely a memory 2732 and a memory 2734, which may be portions of main memory locally attached to the respective processors.

Processors 2770, 2780 may each exchange information with a chipset 2790 via individual P-P interfaces 2752, 2754 using point to point interface circuits 2776, 2794, 2786, 2798. Chipset 2790 may optionally exchange information with the coprocessor 2738 via a high-performance interface 2792. In one embodiment, the coprocessor 2738 is a special-purpose processor, such as, for example, a high-throughput MIC processor, a network or communication processor, compression engine, graphics processor, GPGPU, embedded processor, or the like.

A shared cache (not shown) may be included in either processor or outside of both processors yet connected with the processors via P-P interconnect, such that either or both processors' local cache information may be stored in the shared cache if a processor is placed into a low power mode.

Chipset 2790 may be coupled to a first bus 2716 via an interface 2796. In one embodiment, first bus 2716 may be a Peripheral Component Interconnect (PCI) bus, or a bus such as a PCI Express bus or another third generation I/O interconnect bus, although the scope of the present invention is not so limited.

As shown in FIG. 27, various I/O devices 2714 may be coupled to first bus 2716, along with a bus bridge 2718 which couples first bus 2716 to a second bus 2720. In one embodiment, one or more additional processor(s) 2715, such as coprocessors, high-throughput MIC processors, GPGPU's, accelerators (such as, e.g., graphics accelerators or digital signal processing (DSP) units), field programmable gate arrays, or any other processor, are coupled to first bus 2716. In one embodiment, second bus 2720 may be a low pin count (LPC) bus. Various devices may be coupled to a second bus 2720 including, for example, a keyboard and/or mouse 2722, communication devices 2727 and a storage unit 2728 such as a disk drive or other mass storage device which may include instructions/code and data 2730, in one embodiment. Further, an audio I/O 2724 may be coupled to the second bus 2720. Note that other architectures are possible. For example, instead of the point-to-point architecture of FIG. 27, a system may implement a multi-drop bus or other such architecture.

Figure 28:
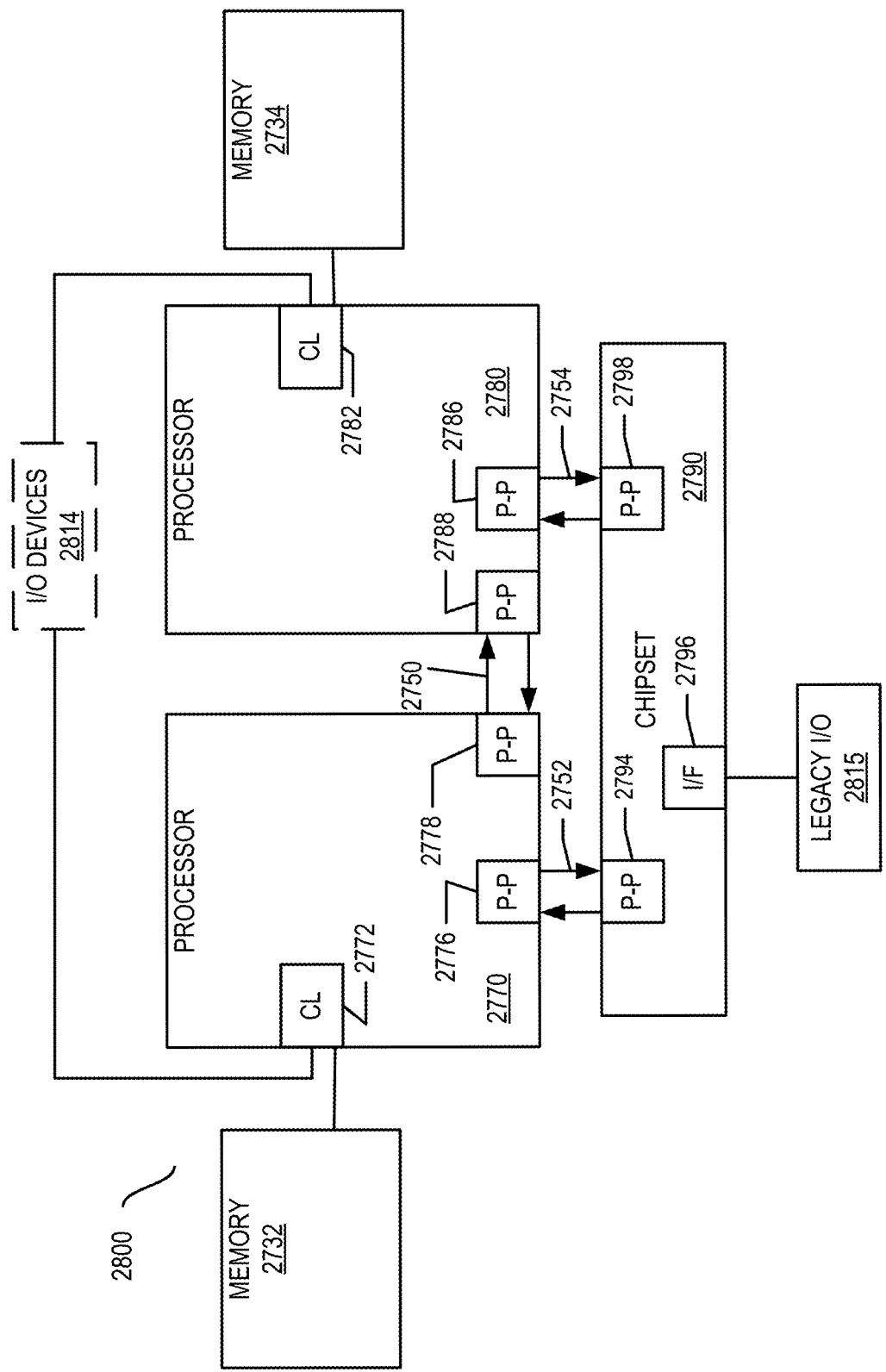

Referring now to FIG. 28, shown is a block diagram of a second more specific exemplary system 2800 in accordance with an embodiment of the present invention. Like elements in FIGS. 27 and 28 bear like reference numerals, and certain aspects of FIG. 27 have been omitted from FIG. 28 in order to avoid obscuring other aspects of FIG. 28.

FIG. 28 illustrates that the processors 2770, 2780 may include integrated memory and I/O control logic ("CL") 2872 and 2782, respectively. Thus, the CL 2872, 2882 include integrated memory controller units and include I/O control logic. FIG. 28 illustrates that not only are the memories 2732, 2734 coupled to the CL 2872, 2882, but also that I/O devices 2814 are also coupled to the control logic 2872, 2882. Legacy I/O devices 2815 are coupled to the chipset 2790.

Figure 29:
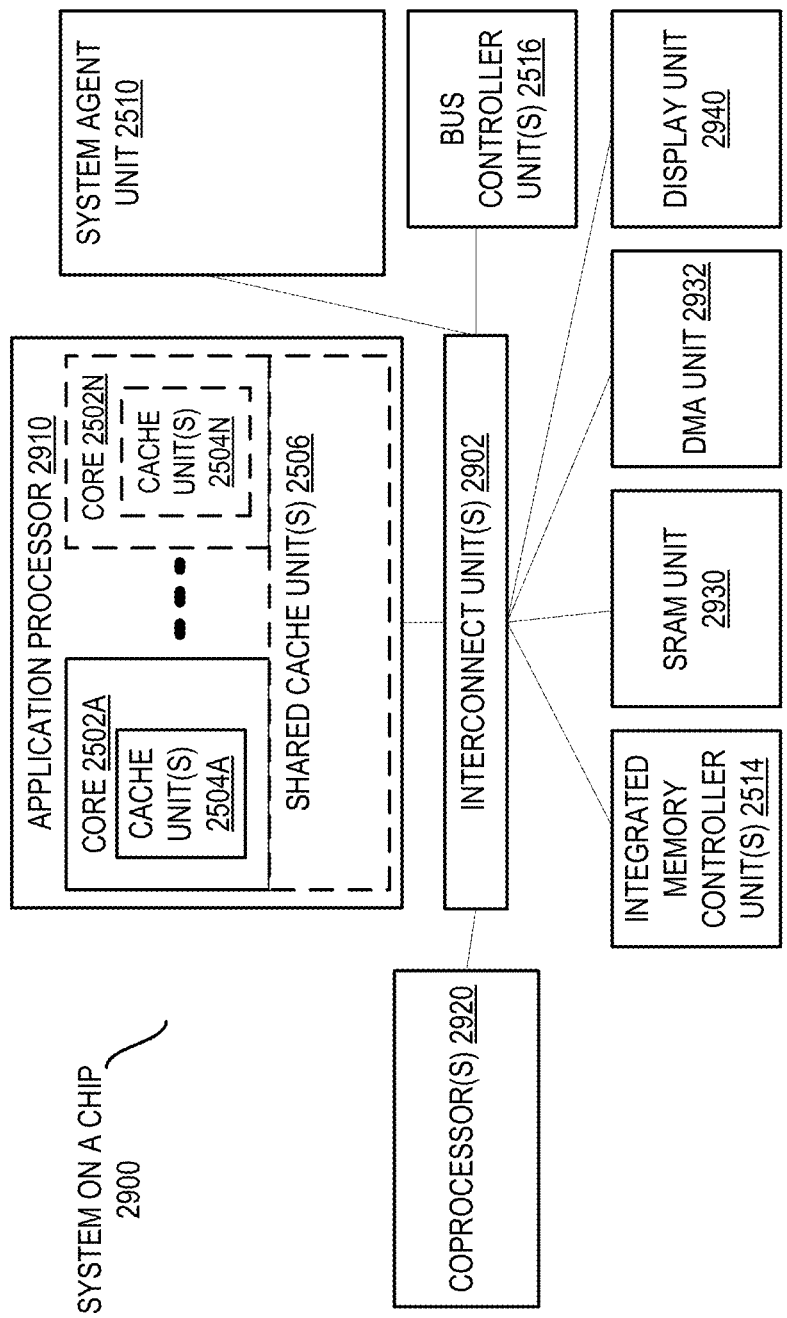

Referring now to FIG. 29, shown is a block diagram of a SoC 2900 in accordance with an embodiment of the present invention. Similar elements in FIG. 25 bear like reference numerals. Also, dashed lined boxes are optional features on more advanced SoCs. In FIG. 29, an interconnect unit(s) 2902 is coupled to: an application processor 2910 which includes a set of one or more cores 2502A-N, which include cache units 2504A-N, and shared cache unit(s) 2506; a system agent unit 2510; a bus controller unit(s) 2516; an integrated memory controller unit(s) 2514; a set or one or more coprocessors 2920 which may include integrated graphics logic, an image processor, an audio processor, and a video processor; an static random access memory (SRAM) unit 2930; a direct memory access (DMA) unit 2932; and a display unit 2940 for coupling to one or more external displays. In one embodiment, the coprocessor(s) 2920 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments may be implemented as computer programs or program code executing on programmable systems comprising at least one processor, a storage system (including volatile and non-volatile memory and/or storage elements), at least one input device, and at least one output device.

Program code, such as code 2730 illustrated in FIG. 27, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 30:
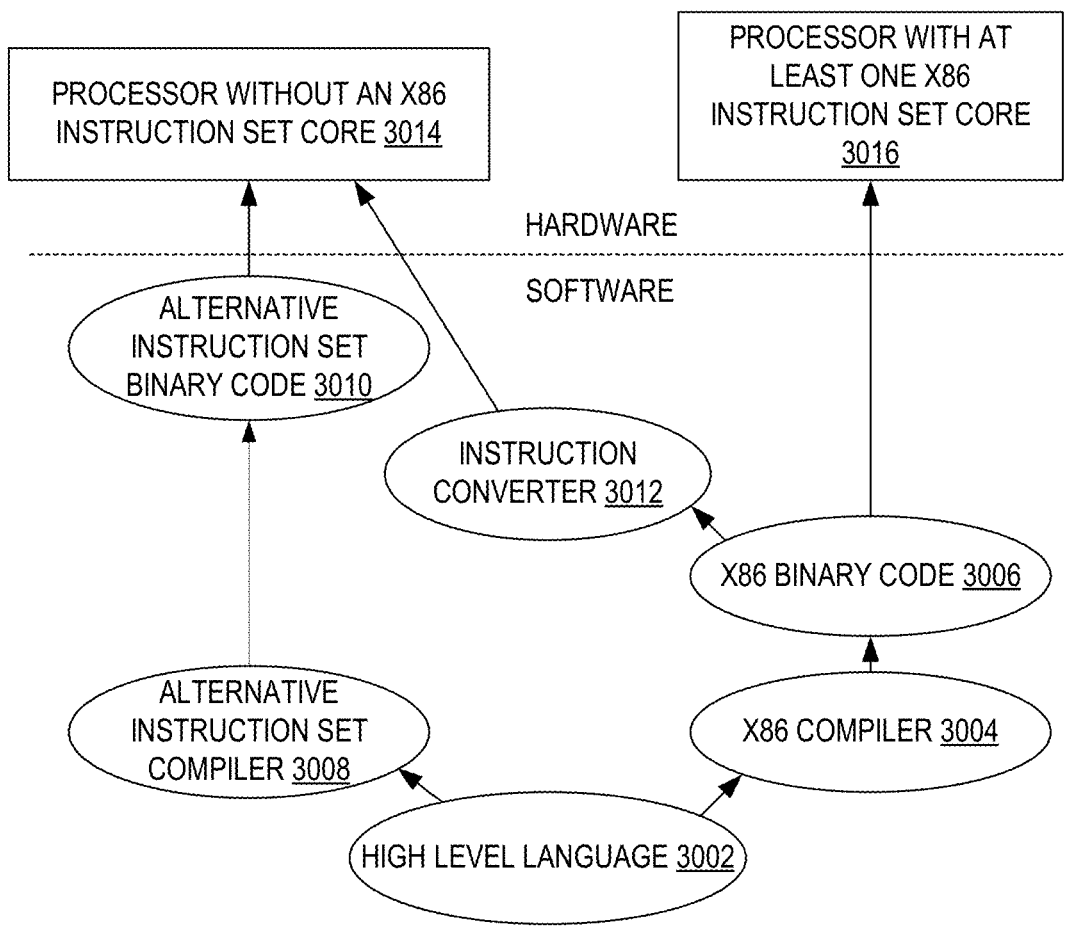
FIG. 30 is a block diagram contrasting the use of a software instruction converter to convert binary instructions in a source instruction set to binary instructions in a target instruction set according to some embodiments.

FIG. 30 is a block diagram contrasting the use of a software instruction converter to convert binary instructions in a source instruction set to binary instructions in a target instruction set according to some embodiments. In the illustrated embodiment, the instruction converter is a software instruction converter, although alternatively the instruction converter may be implemented in software, firmware, hardware, or various combinations thereof. FIG. 30 shows a program in a high-level language 3002 may be compiled using an x86 compiler 3004 to generate x86 binary code 3006 that may be natively executed by a processor with at least one x86 instruction set core 3016. The processor with at least one x86 instruction set core 3016 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 3004 represents a compiler that is operable to generate x86 binary code 3006 (e.g., object code) that can, with or without additional linkage processing, be executed on the processor with at least one x86 instruction set core 3016. Similarly, FIG. 30 shows the program in the high level language 3002 may be compiled using an alternative instruction set compiler 3008 to generate alternative instruction set binary code 3010 that may be natively executed by a processor without at least one x86 instruction set core 3014 (e.g., a processor with cores that execute the MIPS instruction set of MIPS Technologies of Sunnyvale, Calif. and/or that execute the ARM instruction set of ARM Holdings of Sunnyvale, Calif.). The instruction converter 3012 is used to convert the x86 binary code 3006 into code that may be natively executed by the processor without an x86 instruction set core 3014. This converted code is not likely to be the same as the alternative instruction set binary code 3010 because an instruction converter capable of this is difficult to make; however, the converted code will accomplish the general operation and be made up of instructions from the alternative instruction set. Thus, the instruction converter 3012 represents software, firmware, hardware, or a combination thereof that, through emulation, simulation or any other process, allows a processor or other electronic device that does not have an x86 instruction set processor or core to execute the x86 binary code 3006.

FURTHER EXAMPLES

Example 1 provides an exemplary system comprising a multi-threaded processor core (MTPC), the MTPC comprising: P pipelines, each to concurrently process T threads, a crossbar to communicatively couple the P pipelines, a memory for use by the P pipelines, a scheduler to optimize reduction operations by assigning multiple threads to generate results of commutative arithmetic operations, and then accumulate the generated results, and a memory controller (MC) to connect with external storage and other MTPCs, the MC further comprising at least one optimization selected from: an instruction set architecture including a dual-memory operation, a direct memory access (DMA) engine, a buffer to store multiple pending instruction cache requests, multiple channels across which to stripe memory requests, and a shadow-tag coherency management unit.

Example 2 includes the substance of the exemplary system of Example 1, further comprising S sockets, with D dice per socket, and C cores per die, wherein the MTPC is one of the C cores.

Example 3 includes the substance of the exemplary system of Example 2, wherein T equals 16, P equals 4, C equals 8, D equals 32, and S equals 16.

Example 4 includes the substance of the exemplary system of Example 3, wherein the MTPC further includes Q single-threaded pipelines, wherein Q is greater than one.

Example 5 includes the substance of the exemplary system of Example 1, wherein the dual-memory operation comprises one of an indirect load instruction, an indirect store instruction, a load-storect instruction, and an indirect-ld-scrt instruction.

Example 6 includes the substance of the exemplary system of Example 1, wherein the DMA engine is to perform either direct or indirect memory block transfers, and wherein the DMA engine is further to break each load or store block transfer into individual loads or stores, respectively.

Example 7 includes the substance of the exemplary system of Example 1, wherein the buffer supports out-of-order execution by enqueuing and dequeuing instruction cache requests in order, while allowing enqueued instruction cache requests to be serviced out-of-order.

Example 8 includes the substance of the exemplary system of Example 1, wherein a granularity of striping requests across the multiple memory channels is controlled by an N-bit field appended to each memory request address; wherein N is equal to at least two.

Example 9 includes the substance of the exemplary system of Example 1, wherein the coherency requests follow a Modified-Owned-Exclusive-Shared-Invalid plus Forward (MOESI+F) cache coherency protocol.

Example 10 provides an exemplary method performed by a system comprising a multi-threaded processor core (MTPC) comprising a crossbar, a memory, a memory controller (MC), and P pipelines, each pipeline to: fetch an instruction from each of T threads, decode each fetched instruction, perform a dual memory operation for each decoded instruction that is one of an indirect load, an indirect store, a load-storect, and an indirect-ld-scrt, otherwise, execute the T decoded instructions concurrently, doing at least one of: performing block memory transfers using a direct memory access (DMA) engine, storing multiple pending instruction cache requests in a buffer, striping memory requests across multiple memory channels, and using a shadow-tag coherency management unit to manage coherency, store intermediate results in the memory, as necessary, and continue to fetch, decode, and execute remaining instructions from the T threads.

Example 11 includes the substance of the exemplary method of Example 10, wherein the system comprises S sockets, with D dice per socket, and C cores per die, wherein the MTPC is one of the C cores.

Example 12 includes the substance of the exemplary method of Example 11, wherein T equals 16, P equals 4, C equals 8, D equals 32, and S equals 16.

Example 13 includes the substance of the exemplary method of Example 12, wherein the MTPC further includes Q single-threaded pipelines, wherein Q is greater than one.

Example 14 includes the substance of the exemplary method of Example 10, wherein the DMA engine is to perform either direct or indirect memory block transfers, and wherein the DMA engine is further to break each load or store block transfer into individual loads or stores, respectively.

Example 15 includes the substance of the exemplary method of Example 10, wherein the buffer supports out-of-order execution by enqueuing and dequeuing instruction cache requests in order, while allowing enqueued instruction cache requests to be serviced out-of-order.

Example 16 includes the substance of the exemplary method of Example 10, wherein the MTPC further comprises a scheduler to optimize reduction operations by assigning multiple threads to generate results of commutative arithmetic operations, and then to accumulate the generated results.

Example 17 includes the substance of the exemplary method of Example 10, wherein a granularity of striping requests across the multiple memory channels is controlled by an N-bit field appended to each memory request address; wherein N is equal to at least two.

Example 18 includes the substance of the exemplary method of Example 10, wherein the coherency requests follow a Modified-Owned-Exclusive-Shared-Invalid plus Forward (MOESI+F) cache coherency protocol.

Example 19 provides an exemplary non-transitory computer-readable medium containing instructions when performed by a system comprising a multi-threaded processor core (MTPC) comprising a crossbar, a memory, a memory controller (MC), and P pipelines, cause each pipeline to: fetch an instruction from each of T threads, decode each fetched instruction, perform a dual memory operation when the decoded instruction is one of an indirect load, an indirect store, a load-storect, and an indirect-ld-scrt, otherwise, execute the T decoded instructions concurrently, doing at least one of: performing block memory transfers using a direct memory access (DMA) engine, storing multiple pending instruction cache requests in a buffer, striping memory requests across multiple memory channels, and using a shadow-tag coherency management unit to manage coherency, store intermediate results in the memory, as necessary, and continue to fetch, decode, and execute remaining instructions from the T threads.

Example 20 includes the substance of the exemplary non-transitory computer-readable medium of Example 19, wherein the system comprises S sockets, with D dice per socket, and C cores per die, wherein the MTPC is one of the C cores, wherein T equals 16, P equals 4, C equals 8, D equals 32, and S equals 16, and wherein the MTPC further includes Q single-threaded pipelines, wherein Q is greater than one.

What is claimed is:

1. A system comprising:
a first multi-threaded processor core; and
a second multi-threaded processor core coupled to the first multi-threaded processor core,
wherein the first multi-threaded processor core and the second multi-threaded processor core each comprise:
a plurality of pipelines to concurrently process a plurality of threads,
a direct memory access engine,
a memory controller to couple with an external storage, and
a crossbar to couple the plurality of pipelines, the direct memory access engine, and the memory controller,
wherein the memory controller is to, in response to an operation request issued by the direct memory access engine and comprising an opcode and a pointer address:
perform a load of a pointer from the pointer address in the external storage, and
perform an access according to the opcode at a location of the external storage indicated by the pointer,
wherein one of:
the memory controller is to, in response to a second operation request issued by a pipeline of the plurality of pipelines and comprising the opcode and a second pointer address:
perform a load of a second pointer from the second pointer address in the external storage, and
perform a second access according to the opcode at a second location of the external storage indicated by the second pointer;
the opcode indicates the operation request is an indirect store request and the operation request includes a dereferencing offset and a data value to store;
the opcode indicates the operation request is an indirect load-store request and the operation request includes a dereferencing offset and a destination address;
the direct memory access engine is to perform either direct or indirect memory block transfers, and the direct memory access engine is further to break each load or store block transfer into a plurality of individual operation requests and send the operation requests to the memory controller;
the system further comprises a plurality of sockets, with a plurality of dies per socket, and a plurality of cores per die, wherein the first multi-threaded processor core and the second multi-threaded processor core are in a single die; or the plurality of pipelines in each of the first multi-threaded processor core and the second multi-threaded processor core comprise a plurality of single-threaded pipelines and a plurality of multi-threaded pipelines.

2. The system of claim 1, wherein the one is the memory controller is to, in response to the second operation request issued by the pipeline of the plurality of pipelines and comprising the opcode and the second pointer address:
perform the load of the second pointer from the second pointer address in the external storage, and
perform the second access according to the opcode at the second location of the external storage indicated by the second pointer.

3. The system of claim 2, wherein the operation request includes an identifier of the direct memory access engine, the second operation request includes an identifier of the pipeline, and the memory controller is to send an acknowledgment of completion of the access to the direct memory access engine based on the identifier of the direct memory access engine, and send an acknowledgment of completion of the second access to the pipeline based on the identifier of the pipeline.

4. The system of claim 1, wherein the one is the opcode indicates the operation request is the indirect store request and the operation request includes the dereferencing offset and the data value to store.

5. The system of claim 1, wherein the one is the opcode indicates the operation request is the indirect load-store request and the operation request includes the dereferencing offset and the destination address.

6. The system of claim 1, wherein the one is the direct memory access engine is to perform either the direct or the indirect memory block transfers, and the direct memory access engine is further to break each load or store block transfer into the plurality of individual operation requests and send the operation requests to the memory controller.

7. The system of claim 1, wherein the one is the system further comprises the plurality of sockets, with the plurality of dies per socket, and the plurality of cores per die, wherein the first multi-threaded processor core and the second multi-threaded processor core are in the single die.

8. The system of claim 1, wherein the one is the plurality of pipelines in each of the first multi-threaded processor core and the second multi-threaded processor core comprise the plurality of single-threaded pipelines and the plurality of multi-threaded pipelines.

9. A method, performed by a system comprising a first multi-threaded processor core, and a second multi-threaded processor core coupled to the first multi-threaded processor core, wherein the first multi-threaded processor core and the second multi-threaded processor core each comprise: a plurality of pipelines to concurrently process a plurality of threads,
a direct memory access engine, a memory controller to couple with an external storage, and a crossbar to couple the plurality of pipelines, the direct memory access engine, and the memory controller, comprising:
sending an operation request comprising an opcode and a pointer address by the direct memory access engine to the memory controller;
performing, by the memory controller in response to the operation request, a load of a pointer from the pointer address in the external storage; and
performing, by the memory controller in response to the operation request, an access according to the opcode at a location of the external storage indicated by the pointer,
wherein one of:
the method further comprises:
sending a second operation request comprising the opcode and a second pointer address by a pipeline of the plurality of pipelines to the memory controller,
performing, by the memory controller in response to the second operation request, a load of a second pointer from the second pointer address in the external storage, and
performing, by the memory controller in response to the second operation request, a second access according to the opcode at a second location of the external storage indicated by the second pointer;
the opcode indicates the operation request is an indirect store request and the operation request includes a dereferencing offset and a data value to store;
the opcode indicates the operation request is an indirect load-store request and the operation request includes a dereferencing offset and a destination address;
the direct memory access engine is to perform either direct or indirect memory block transfers, and the direct memory access engine is further to break each load or store block transfer into a plurality of individual operation requests and send the operation requests to the memory controller;
the system comprises a plurality of sockets, with a plurality of dies per socket, and a plurality of cores per die, wherein the first multi-threaded processor core and the second multi-threaded processor core are in a single die; or
the plurality of pipelines in each of the first multi-threaded processor core and the second multi-threaded processor core comprise a plurality of single-threaded pipelines and a plurality of multi-threaded pipelines.

10. The method of claim 9, wherein the one is the method further comprises:
sending the second operation request comprising the opcode and the second pointer address by the pipeline of the plurality of pipelines to the memory controller;
performing, by the memory controller in response to the second operation request, the load of the second pointer from the second pointer address in the external storage; and
performing, by the memory controller in response to the second operation request, the second access according to the opcode at the second location of the external storage indicated by the second pointer.

11. The method of claim 10, wherein the operation request includes an identifier of the direct memory access engine, the second operation request includes an identifier of the pipeline, and the method further comprises:
sending, by the memory controller, an acknowledgment of completion of the access to the direct memory access engine based on the identifier of the direct memory access engine; and
sending, by the memory controller, an acknowledgment of completion of the second access to the pipeline based on the identifier of the pipeline.

12. The method of claim 9, wherein the one is the opcode indicates the operation request is the indirect store request and the operation request includes the dereferencing offset and the data value to store.

13. The method of claim 9, wherein the one is the opcode indicates the operation request is the indirect load-store request and the operation request includes the dereferencing offset and the destination address.

14. The method of claim 9, wherein the one is the direct memory access engine is to perform either the direct or the indirect memory block transfers, and the direct memory access engine is further to break each load or store block transfer into the plurality of individual operation requests and send the operation requests to the memory controller.

15. The method of claim 9, wherein the one is the system comprises the plurality of sockets, with the plurality of dies per socket, and the plurality of cores per die, wherein the first multi-threaded processor core and the second multi-threaded processor core are in the single die.

16. The method of claim 9, wherein the one is the plurality of pipelines in each of the first multi-threaded processor core and the second multi-threaded processor core comprise the plurality of single-threaded pipelines and the plurality of multi-threaded pipelines.

17. A non-transitory machine-readable medium containing code, that when executed by a system comprising a first multi-threaded processor core, and a second multi-threaded processor core coupled to the first multi-threaded processor core, wherein the first multi-threaded processor core and the second multi-threaded processor core each comprise: a plurality of pipelines to concurrently process a plurality of threads, a direct memory access engine, a memory controller to couple with an external storage, and a crossbar to couple the plurality of pipelines, the direct memory access engine, and the memory controller, causes a method comprising:
  sending an operation request comprising an opcode and a pointer address by the direct memory access engine to the memory controller;
  performing, by the memory controller in response to the operation request, a load of a pointer from the pointer address in the external storage; and
  performing, by the memory controller in response to the operation request, an access according to the opcode at a location of the external storage indicated by the pointer,
  wherein one of:
    the method further comprises:
      sending a second operation request comprising the opcode and a second pointer address by a pipeline of the plurality of pipelines to the memory controller,
      performing, by the memory controller in response to the second operation request, a load of a second pointer from the second pointer address in the external storage, and
      performing, by the memory controller in response to the second operation request, a second access according to the opcode at a second location of the external storage indicated by the second pointer;
    the opcode indicates the operation request is an indirect store request and the operation request includes a dereferencing offset and a data value to store;
    the opcode indicates the operation request is an indirect load-store request and the operation request includes a dereferencing offset and a destination address;
    the direct memory access engine is to perform either direct or indirect memory block transfers, and the direct memory access engine is further to break each load or store block transfer into a plurality of individual operation requests and send the operation requests to the memory controller;
    the system comprises a plurality of sockets, with a plurality of dies per socket, and a plurality of cores per die, wherein the first multi-threaded processor core and the second multi-threaded processor core are in a single die; or
    the plurality of pipelines in each of the first multi-threaded processor core and the second multi-threaded processor core comprise a plurality of single-threaded pipelines and a plurality of multi-threaded pipelines.

18. The non-transitory machine-readable medium of claim 17, wherein the one is the method further comprises:
  sending the second operation request comprising the opcode and the second pointer address by the pipeline of the plurality of pipelines to the memory controller;
  performing, by the memory controller in response to the second operation request, the load of the second pointer from the second pointer address in the external storage; and
  performing, by the memory controller in response to the second operation request, the second access according to the opcode at the second location of the external storage indicated by the second pointer.

19. The non-transitory machine-readable medium of claim 18, wherein the operation request includes an identifier of the direct memory access engine, the second operation request includes an identifier of the pipeline, and the method further comprises:
  sending, by the memory controller, an acknowledgment of completion of the access to the direct memory access engine based on the identifier of the direct memory access engine; and
  sending, by the memory controller, an acknowledgment of completion of the second access to the pipeline based on the identifier of the pipeline.

20. The non-transitory machine-readable medium of claim 17, wherein the one is the opcode indicates the operation request is the indirect store request and the operation request includes the dereferencing offset and the data value to store.

21. The non-transitory machine-readable medium of claim 17, wherein the one is the opcode indicates the operation request is the indirect load-store request and the operation request includes the dereferencing offset and the destination address.

22. The non-transitory machine-readable medium of claim 17, wherein the one is the direct memory access engine is to perform either the direct or the indirect memory block transfers, and the direct memory access engine is further to break each load or store block transfer into the plurality of individual operation requests and send the operation requests to the memory controller.

23. The non-transitory machine-readable medium of claim 17, wherein the one is the system comprises the plurality of sockets, with the plurality of dies per socket, and the plurality of cores per die, wherein the first multi-threaded processor core and the second multi-threaded processor core are in the single die.

24. The non-transitory machine-readable medium of claim 17, wherein the one is the plurality of pipelines in each of the first multi-threaded processor core and the second multi-threaded processor core comprise a plurality of single-threaded pipelines and a plurality of multi-threaded pipelines.

* * * * *